United States Patent
Tsang et al.

(10) Patent No.: US 12,121,885 B2
(45) Date of Patent: Oct. 22, 2024

(54) PHOTOCATALYST

(71) Applicant: Oxford University Innovation Limited, Oxford (GB)

(72) Inventors: Shik Chi Edman Tsang, Oxford (GB); Jianwei Zheng, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 383 days.

(21) Appl. No.: 17/441,315

(22) PCT Filed: Mar. 18, 2020

(86) PCT No.: PCT/GB2020/050715
§ 371 (c)(1),
(2) Date: Sep. 21, 2021

(87) PCT Pub. No.: WO2020/193951
PCT Pub. Date: Oct. 1, 2020

(65) Prior Publication Data
US 2022/0161247 A1    May 26, 2022

(30) Foreign Application Priority Data

Mar. 22, 2019 (GB) .................................. 1904004

(51) Int. Cl.
*B01J 35/00* (2024.01)
*B01J 27/051* (2006.01)
(Continued)

(52) U.S. Cl.
CPC ............. *B01J 35/39* (2024.01); *B01J 27/051* (2013.01); *B01J 35/40* (2024.01); *B01J 37/343* (2013.01); *C01C 1/0411* (2013.01)

(58) Field of Classification Search
None
See application file for complete search history.

(56) References Cited

U.S. PATENT DOCUMENTS 7,078,130 B2    7/2006 Antonelli
8,801,915 B2    8/2014 Hikazudani et al.
(Continued)

FOREIGN PATENT DOCUMENTS

CN    103 440 997 A    12/2013
CN    104338547 A  *  2/2015
(Continued)

OTHER PUBLICATIONS

CN-104338547-A—English translation, 2015 (Year: 2015).*
(Continued)

*Primary Examiner* — Stefanie J Cohen
(74) *Attorney, Agent, or Firm* — Thomas|Horstemeyer, LLP

(57) ABSTRACT

A photocatalyst is described that is suitable for converting molecular nitrogen into ammonia. The photocatalyst comprises a layered base material comprising 1 to 100 layers, the layered base material being selected from the group consisting of molybdenum disulfide, tungsten disulfide, molybdenum telluride, tungsten telluride, molybdenum selenide and tungsten selenide, a layered base material comprising 1 to 100 layers, the layered base material being selected from the group consisting of molybdenum disulfide, tungsten disulfide, molybdenum telluride, tungsten telluride, molybdenum selenide and tungsten selenide, and 0.1-10.0% by weight, relative to the weight of the base material, of one or more Group VI, VII, VIII, IX or X transition metals. The photocatalyst can further comprise 0.1-50.0% by weight, relative to the weight of the base material, of one or more semiconductor materials having an average particle size of 0.5-50.0 nm. The photocatalyst exhibits high catalytic efficiency without the need for high temperature and pressure. Also described is a process for the preparation of the
(Continued)

photocatalyst, as well as uses of the photocatalyst for converting molecular nitrogen into ammonia.

19 Claims, 22 Drawing Sheets

(51) Int. Cl.
- B01J 35/39 (2024.01)
- B01J 35/40 (2024.01)
- B01J 37/34 (2006.01)
- C01C 1/04 (2006.01)

(56) References Cited

U.S. PATENT DOCUMENTS

| | | |
|---|---|---|
| 9,592,495 B2 | 3/2017 | Yoshinaga et al. |
| 2011/0286907 A1 | 11/2011 | Nakamura et al. |
| 2016/0193595 A1* | 7/2016 | Nagpal .................. B01J 35/40 502/220 |
| 2019/0030516 A1* | 1/2019 | Zhang ..................... B01J 35/33 |

FOREIGN PATENT DOCUMENTS

| | | |
|---|---|---|
| CN | 104 525 938 A | 4/2015 |
| CN | 104630811 A | 5/2015 |
| CN | 106 964 372 A | 7/2017 |
| CN | 108 855 149 A | 11/2018 |
| WO | 2020/000044 A1 | 1/2020 |
| WO | 2020/000055 A1 | 1/2020 |

OTHER PUBLICATIONS

Munoz Caro et al Amino acids from ultraviolet irradiation from interstellar ice analogues Journal Mar. 28, 2002 403-406 vol. 416 Nature.

W. W. Dunn, Y. Aikawa, A. J. Bard Heterogeneous Photosynthetic Production of Amino Acids at Pt/TiO2 Suspensions by Near Ultraviolet Light Journal Mar. 4, 1981 6893-6897 vol. 103 Am. Chem. Soc.

Guoliang Lui et al. MoS2 monolayer catalyst doped with isolated Co atoms for the hydrodeoxygenation reaction Journal Mar. 6, 2017 810-816 vol. 9 Nature Chemistry.

Hachtel, J. A. et al. Gold nanotriangles decorated with superparamagnetic iron oxide nanoparticles: a compositional and microstructural study Journal Mar. 11, 2016 215-227 vol. 191 Farad. Diss.

Lau, T. H. et al. Transition metal atom doping of the basal plane of MoS2 monolayer nanosheets for electrochemical hydrogen evolution Journal Apr. 30, 2018 4769-4776 vol. 9 Chemical Science.

Liu, G. et al Hydrazine-Assisted Liquid Exfoliation of MoS2 for Catalytic Hydrodeoxygenation of 4-Methylphenol. Journal Jan. 12, 2016 2910-2914 vol. 22 Chem. Eur. J.

Malmali, M., Wei, Y., Mccormick, A., Cussler, E.L. Ammonia Synthesis at Reduced Pressure via Reactive Separation Journal Jul. 25, 2016 8922-8932 vol. 55 (33) Ind. Eng. Chem. Res.

Miller, Stanley L., Urey, Harold C, 1959, Organic compound synthesis on the primitive earth Journal Jul. 31, 1959 245-251 vol. 130 (3370), Science.

H. Reiche, A. J. Bard Heterogeneous photosynthetic production of amino acids from methaneammonia-water at platinum/titanium dioxide. Implications in chemical evolution Journal May 1, 1979 3127-3128 vol. 101 J. Am. Chem. Soc.

Rivas Manuel, Del Valle Luis J., Turon Pau, Aleman Carlos, Puiggali, Jordi Sustainable synthesis of amino acids by catalytic fixation of molecular dinitrogen and carbon dioxide Journal Dec. 18, 2017 685-693 vol. 20 Green Chemistry.

Kiao, F. X., Miao, J. & Liu, B. Layer-by-layer self-assembly of CdS quantum dots/graphene nanosheets hybrid films for photoelectrochemical and photocatalytic applications Journal Jan. 6, 2014 1559-1569 vol. 136 J. Am. Chem. Soc.

Yao, Y. et al. A spectroscopic study on the nitrogen electrochemical reduction reaction on gold and platinum surfaces Journal Jan. 10, 2018 1496-1501 vol. 140 J. Am. Chem. Soc.

Ye, L., Nayak-Luke, R., Banares-Alcantara, R. Tsang, E. Reaction: "Green" Ammonia Production 3, 9 712-714 (2017) Journal Nov. 9, 2017 709-714 vol. 3 Chem.

International Search Report and Written Opinion for WO 2020/193951 (PCT/GB2020/050715), dated Jun. 25, 2020, pp. 1-22.

UK Search Report for GB 1904004.7, dated Sep. 27, 2019, pp. 1-4.

Ma Xiaoyan et al: "Ultrathin Co(Ni)-doped MoS2nanosheets as catalytic promoters enabling efficient solar hydrogen production", Nano Research, Tsinghua University Press, CN, vol. 9, No. 8, Jun. 13, 2016 (Jun. 13, 2016), pp. 2284-2293.

Lei Yang et al: "Optical Properties of Metal-Molybdenum Disulfide Hybrid Nanosheets and Their Application for Enhanced Photocatalytic Hydrogen Evolution", ACS NANO, vol. 8, No. 7, Jun. 2, 2014 (Jun. 2, 2014), pp. 6979-6985.

Ma Xinguo et al: "N2 reduction using single transition-metal atom supported on defective WS2 monolayer as promising catalysts: A OFT study", Applied Surface Science, Elsevier, Amsterdam, NL, vol. 489, May 5, 2019 (May 5, 2019), pp. 684-692.

Maimaitizi Hujiabudula et al: "Facile photo-ultrasonic assisted synthesis of flower-like Pt/N—MoS2 microsphere as an efficient sonophotocatalyst for nitrogen fixation", Ultrasonics: Sonochemistry, Butterworth-Heinemann, GB, vol. 63, Jan. 2, 2020 (Jan. 2, 2020).

Kiu Wang et al: "Recyclable Nanoscale Zero Valent Iron Doped g-C 3 N 4 /MoS 2 for Efficient Photocatalysis of RhB and Cr(VI) Driven by Visible Light", ACS Sustainable Chemistry & Engineering, vol. 4, No. 7, Jun. 9, 2016 (Jun. 9, 2016), pp. 4055-4063.

\* cited by examiner

PHOTOCATALYST

CROSS-REFERENCE TO RELATED APPLICATIONS

This application is the National Stage of International Application No. PCT/GB2020/050715, filed Mar. 18, 2020, which claims priority to GB 1904004.7, filed Mar. 22, 2019, which are entirely incorporated herein by reference.

The present invention relates to a photocatalyst. More particularly, the present invention relates to a photocatalyst that is suitable for converting molecular nitrogen ($N_2$) into ammonia. The present invention also relates to a process for the preparation of the catalyst, as well as uses of the catalyst for converting molecular nitrogen into ammonia.

BACKGROUND OF THE INVENTION

In nature, atmospheric nitrogen ($N_2$) is biologically fixed into ammonia ($NH_3$) by nitrogenase enzymes under ambient conditions. Biological nitrogen fixation (BNF) is essential for life forms because such inorganic nitrogen compounds are required for the biosynthesis of basic building blocks, such as DNA and proteins. In consideration of the great importance of nitrogen fixation for human activity, scientists continue to devote substantial efforts in promoting the artificial ammonia production on a large scale.

One of the most important artificial nitrogen fixation (ANF) processes discovered in the last century, the Haber-Bosch (HB) process, has an immense impact on food production globally. Today, more than half of the world's ammonia is obtained through the centralized industrial HB process, in which $NH_3$ is produced via a dissociative pathway involving co-activation of the $N_2$ and $H_2$ over an Fe-based catalyst[1]. This process first frees the nitrogen atoms from their triply bonded diatomic form, N≡N before they are hydrogenated to ammonia on a catalytic surface. The bond strength can be as high as 9.8 eV to liberate N, thus requiring the HB process to be operated at elevated temperature and pressure (routinely 500° C. and 200 bar)[2]. In addition, the unfavourable thermodynamic position towards reactants at high temperature makes the process inefficient. More importantly, $H_2$ is obtained from steam reforming of natural gas to combine with $N_2$ from air, which accounts for 1.2% of the global primary energy demand. The process is therefore extremely carbon intensive and approximately 1.5 kg $CO_2$/kg $NH_3$ is released into the atmosphere, representing 0.93% of global greenhouse gas (GHG)[3]. The ammonia transport and distribution from centralized reactors further contribute to $CO_2$ emissions.

In comparison, BNF at small scale is able to overcome these limitations by operating the synthesis at room temperature and pressure (25° C. and 1 bar) via an associative pathway. However, it still requires a large input of chemical energy provided by the hydrolysis of adenosine 5'-triphosphate (ATP)[4].

Iron (or sometimes Mo) sulphur (Fe—S) clusters with tetrahedral Fe/Mo and weak field S ligands are the established molecular electron relay centres for fast redox catalysis in biology[5]. In particular, nitrogenase is a multiprotein complex consisting of an Fe-sulphur protein and an associated MoFe-sulphur clusters protein. ATP is consumed at the Fe-sulphur [4Fe-4S] protein which also delivers the generated electrons by a remote outer sphere mechanism[6] to the catalytic MoFe protein with the iron-molybdenum cofactor (FeMoco) containing [Mo:7Fe:9S:C][7]. The electrons once transferred are believed to finally accumulate at the FeMoco via the molecular electron relay of Fe—S cluster centres and subsequently be utilized for the reduction of $N_2$[8,9,10].

Structural and functional mimicking of nitrogenase to produce ammonia is an ongoing scientific endeavour, although most research efforts have to date focussed on enzymatic processes[11,12,13].

The present invention was devised with the foregoing in mind.

SUMMARY OF THE INVENTION

According to a first aspect of the present invention there is provided a photocatalyst comprising:
  a) a layered base material comprising 1 to 100 layers, the layered base material being selected from the group consisting of molybdenum disulfide, tungsten disulfide, molybdenum telluride, tungsten telluride, molybdenum selenide and tungsten selenide; and
  b) 0.1-10.0% by weight, relative to the weight of the base material, of one or more Group VI, VII, VIII, IX or X transition metals.

According to a second aspect of the present invention there is provided a process for preparing a photocatalyst as defined herein, the process comprising the steps of:
  a) providing a dispersion of a layered base material comprising 1 to 100 layers, the layered base material being selected from the group consisting of molybdenum disulfide, tungsten disulfide, molybdenum telluride, tungsten telluride, molybdenum selenide and tungsten selenide; and
  b) contacting the dispersion of the layered base material with a solution of one or more Group VI, VII, VIII, IX or X transition metals.

According to a third aspect of the present invention there is provided a photocatalyst obtainable, obtained or directly obtained by a process according to the second aspect of the invention.

According to a fourth aspect of the present invention there is provided a use of a photocatalyst as defined by the first or third aspect of the invention in the conversion of molecular nitrogen to ammonia.

According to a fifth aspect of the present invention there is provided a photocatalytic process for the conversion of molecular nitrogen to ammonia, the process comprising the step of:
  a) contacting molecular nitrogen with a photocatalyst as defined by the first or third aspect of the invention in the presence of water;
  wherein step a) is performed under the application of electromagnetic radiation having a wavelength of 270-1000 nm.

DETAILED DESCRIPTION OF THE INVENTION

Photocatalyst

In a first aspect, the present invention provides a photocatalyst comprising:
  a) a layered base material comprising 1 to 100 layers, the layered base material being selected from the group consisting of molybdenum disulfide, tungsten disulfide, molybdenum telluride, tungsten telluride, molybdenum selenide and tungsten selenide; and
  b) 0.1-10.0% by weight, relative to the weight of the base material, of one or more Group VI, VII, VIII, IX or X transition metals.

Through intensive investigations, the inventors have synthesised a catalyst having a core structure mimicking that of biological nitrogenase. The catalyst is highly active at converting molecular nitrogen from air into ammonia in water under visible light illumination without the need for high temperatures and pressure. Moreover, the catalyst exhibits high catalytic efficiency even without the use of a sacrificial agent (e.g. methanol or formaldehyde).

In an embodiment, the layered base material has a trigonal prismatic (2H) or octahedral structure (1T). Suitably, the layered base material has a trigonal prismatic structure.

In an embodiment, the layered base material is molybdenum disulfide. The molybdenum disulfide layered base material may have a trigonal prismatic or octahedral structure. Most suitably, the molybdenum disulfide layered base material has a trigonal prismatic structure.

The layered base material has a maximum of 100 layers provided in a stacked arrangement. Alternatively, the layered base material may have fewer layers. In an embodiment, the layered base material (e.g. molybdenum disulfide) comprises 1 to 50 layers. Suitably, the layered base material comprises 1 to 20 layers. More suitably, the layered base material comprises 1 to 10 layers. Most suitably, the layered base material comprises 1 to 5 layers. The layered base material may be the product of exfoliating a bulk quantity of the base material.

In an embodiment, the one or more Group VI, VII, VIII, IX or X transition metals is selected from the group consisting of Fe, Mn, Co, Mo, Ni, Ru, Rh, Pd and Pt. Suitably, the one or more transition metals is selected from the group consisting of Fe, Mn, Co, Ni and Ru. More suitably, the one or more transition metals is selected from the group consisting of Fe, Co and Ru. Even more suitably, the one or more transition metals is Fe or Ru. Most suitably, the one or more transition metals is Fe.

In a particular embodiment, the one or more Group VI, VII, VIII, IX or X transition metals is not Co.

In an embodiment, the one or more Group VI, VII, VIII, IX or X transition metals is Fe and optionally one or more selected from the group consisting of Mn, Co, Ni and Ru.

In an embodiment, the photocatalyst comprises 0.1-8.0% by weight, relative to the weight of the base material, of one or more Group VI, VII, VIII, IX or X transition metals. Suitably, the photocatalyst comprises 0.1-6.0% by weight, relative to the weight of the base material, of the one or more transition metals. More suitably, the photocatalyst comprises 0.5-5.0% by weight, relative to the weight of the base material, of the one or more transition metals. Even more suitably, the photocatalyst comprises 1.0-3.0% by weight, relative to the weight of the base material, of the one or more transition metals. Most suitably, the photocatalyst comprises 1.5-2.5% by weight, relative to the weight of the base material, of the one or more transition metals.

In a particular embodiment, the photocatalyst comprises 1.0-3.0% by weight, relative to the weight of the base material, of one or more Group VI, VII, VIII, IX or X transition metals being Fe.

At least a portion of the one or more Group VI, VII, VIII, IX or X transition metals may be provided as single atoms or clusters of single atoms having a maximum diameter of 4.0 nm. Suitably, ≥50% of the transition metal is provided as single atoms of the transition metal or clusters of single atoms of the transition metal having a maximum diameter of 4.0 nm. More suitably, ≥75% of the transition metal is provided as single atoms of the transition metal or clusters of single atoms of the transition metal having a maximum diameter of 4.0 nm. Most suitably, ≥90% of the transition metal is provided as single atoms of the transition metal or clusters of single atoms of the transition metal having a maximum diameter of 4.0 nm. The amount of transition metal in the photocatalyst can be determined using analytical techniques such as inductively coupled plasma (ICP) and atomic adsorption (AA).

In an embodiment, the one or more Group VI, VII, VIII, IX or X transition metals is provided as single atoms or clusters of single atoms having a maximum diameter of 2.5 nm. Most suitably, the one or more transition metals is provided as single atoms or clusters of single atoms having a maximum diameter of 1.0 nm.

The one or more Group VI, VII, VIII, IX or X transition metals may be provided as:
A) single atoms or clusters of single atoms, wherein the single atoms or clusters of single atoms are provided on and/or throughout the layered base material;
B) single atoms that are incorporated into the molecular framework of the layered base material by replacing one or more atoms of the layered base material; or
C) a mixture of A) and B).

By way of non-limiting example, when the layered base material is molybdenum disulfide, at least a portion of the one or more Group VI, VII, VIII, IX or X transition metals (e.g. Fe) may be provided as single atoms that are incorporated into the molecular structure of molybdenum disulfide by replacing some of the S or Mo atoms, or both.

When used in relation to the one or more Group VI, VII, VIII, IX or X transition metals, the term "atom" encompasses uncharged (e.g. metallic) and charged (e.g. ionic) forms. For example, when single atoms or clusters of single atoms of the transition metal are provided on and/or throughout the layered base material, they may be present in their metallic form. When single atoms are incorporated into the molecular framework of the layered base material by replacing one or more atoms of the layered base material they may be present in their ionic form. The one or more Group VI, VII, VIII, IX or X transition metals may interconvert between these different forms within the photocatalyst.

In a particular embodiment, the layered base material is molybdenum disulfide and the one or more Group VI, VII, VIII, IX or X transition metals is Fe. Suitably, the layered base material comprises 1 to 10 layers. More suitably, the layered base material comprises 1 to 10 layers and the one or more Group VI, VII, VIII, IX or X transition metals is present in an amount of 0.5-5.0% by weight, relative to the weight of the base material.

In an embodiment, the photocatalyst further comprises 0.1-50.0% by weight, relative to the combined weight of the base material and one or more Group VI, VII, VIII, IX or X transition metals, of one or more semiconductor materials having an average particle size of 0.5-50.0 nm. Suitably, the photocatalyst further comprises 1.0-30.0% by weight, relative to the combined weight of the base material and one or more Group VI, VII, VIII, IX or X transition metals, of one or more semiconductor materials having an average particle size of 0.5-50.0 nm. Most suitably, the photocatalyst further comprises 5.0-15.0% (e.g. 8.0-12.0%) by weight, relative to the combined weight of the base material and one or more Group VI, VII, VIII, IX or X transition metals, of one or more semiconductor materials having an average particle size of 0.5-50.0 nm.

The one or more semiconductor materials suitably has an average particle size of 0.5-15.0 nm. Most suitably, the one or more semiconductor materials has an average particle size of 1.0-10.0 nm. The one or more semiconductor materials may be described as quantum dots (e.g. cadmium sulfide quantum dots).

The one or more semiconductor materials may have the compositional formula $AB_xC_{1-x}$, wherein
A is selected from the group consisting of Cd, Pb and In;
B and C are selected from the group consisting of S, Se, Te, As and P; and
x is a number ranging from 0.01 to 1.

In an embodiment, the one or more semiconductor materials is selected from the group consisting of cadmium sulfide, lead sulfide, cadmium telluride, lead telluride, cadmium selenide and lead selenide. Most suitably, the one or more semiconductor materials is cadmium sulfide.

In an embodiment, the photocatalyst a provided as a plurality of particles having an average particle size of 0.05-100.0 µm. Suitably, the photocatalyst a provided as a plurality of particles having an average particle size of 0.05-10.0 µm. More suitably, the photocatalyst a provided as a plurality of particles having an average particle size of 0.05-1.0 µm. Most suitably, the photocatalyst a provided as a plurality of particles having an average particle size of 0.05-0.5 µm.

In an embodiment, the photocatalyst is fixed to (e.g. immobilized on or supported on/by) a supporting substrate (e.g. as part of a fixed bed apparatus).

Preparation of photocatalyst

In a second aspect, the present invention provides a process for preparing a photocatalyst according to the first aspect of the invention, the process comprising the steps of:
a) providing a dispersion of a layered base material comprising 1 to 100 layers, the layered base material being selected from the group consisting of molybdenum disulfide, tungsten disulfide, molybdenum telluride, tungsten telluride, molybdenum selenide and tungsten selenide; and
b) contacting the dispersion of the layered base material with a solution of one or more Group VI, VII, VIII, IX or X transition metals.

As described hereinbefore in relation to the first aspect of the invention, photocatalysts obtainable by the process of the second aspect of the invention are highly active at converting molecular nitrogen from air into ammonia in water under visible light illumination without the need for high temperatures and pressure. Moreover, the catalysts exhibit high catalytic efficiency even without the use of a sacrificial agent (e.g. methanol or formaldehyde).

The layered base material and one or more Group VI, VII, VIII, IX or X transition metals may have any of those definitions described hereinbefore in relation to the first aspect of the invention.

In an embodiment, the dispersion of step a) comprises the layered base material dispersed in a liquid. Suitably, the liquid is a mixture of water and isopropyl alcohol. More suitably, the liquid is a mixture of water and isopropyl alcohol in a volume ratio of 1:1-5 (e.g. 1:3). Additionally, the dispersion may include a surfactant, a non-limiting example of which is polyvinylpyrrolidone (PVP).

In an embodiment, the layered base material comprising 1 to 100 layers is prepared by exfoliating the base material in its bulk form. Suitably, the base material in its bulk form is exfoliated by:
(i) contacting an aqueous mixture of the base material in its bulk form with an intercalant;
(ii) sonicating the mixture resulting from step (i); and
(iii) isolating the layered base material comprising 1 to 100 layers resulting from step (ii).

The aqueous mixture may comprise water and optionally an organic solvent. Suitably, the aqueous mixture comprises water and isopropyl alcohol. More suitably, the aqueous mixture comprises water and isopropyl alcohol in a volume ratio of 1:1-5 (e.g. 1:3).

The term intercalant is synonymous with an exfoliant. Any suitable intercalant may be used, examples of which include surfactants and solvent molecules. In a particular embodiment, the intercalant is hydrazine or lithium. Suitably, the intercalant is lithium.

In an embodiment, step (iii) comprises:
(iii-a) centrifuging the mixture resulting from step (ii); and
(iii-b) washing and then drying the solid resulting from step (iii-a).

In an embodiment, the solution of one or more Group VI, VII, VIII, IX or X transition metals is prepared by dissolving one or more Group VI, VII, VIII, IX or X transition metal precursor compounds in a solvent. For example, when the one or more Group VI, VII, VIII, IX or X transition metal is Fe, the precursor compound Fe nitrate may be dissolved in thiourea solution.

The conditions for carrying out step b) are not particularly limited. In an embodiment, step b) is conducted at a temperature of 10-325° C., optionally under hydrothermal conditions (e.g. in a sealed autoclave). Suitably, step b) is conducted at a temperature of 100-200° C., optionally under hydrothermal conditions. More suitably, step b) is conducted at a temperature of 130-190° C., under hydrothermal conditions. Although step b) can be conducted at room temperature, performing this step at higher temperatures and under hydrothermal conditions may result in fewer agglomerates of the one or more Group VI, VII, VIII, IX or X transition metals.

The process may additionally comprise the following step the process further includes the step:
c) isolating the photocatalyst resulting from step b).

In an embodiment, the photocatalyst resulting from step b) (or that isolated from step c)) is contacted with an aqueous solution of one or more semiconductor materials having an average particle size of 0.5-50.0 nm.

The one or more semiconductor materials may have any of those definitions described hereinbefore in relation to the first aspect of the invention.

In an embodiment, the photocatalyst resulting from step b) (or that isolated from step c)) is contacted with an aqueous solution of one or more semiconductor materials by immersing the photocatalyst in the aqueous solution for 10 minutes to 3 hours (e.g. 0.5-1.5 hours).

In an embodiment, the aqueous solution of one or more semiconductor materials comprises 0.05-0.5 mg (e.g. 0.2-0.3 mg) of the one or more semiconductor materials per mL of water.

In a third aspect, the present invention provides a photocatalyst obtainable, obtained or directly obtained by a process according to the second aspect of the invention.

Applications of the Photocatalyst

In a fourth aspect, the present invention provides a use of a photocatalyst as defined by the first or third aspect of the invention in the conversion of molecular nitrogen to ammonia.

In a fifth aspect, the present invention provides a photocatalytic process for the conversion of molecular nitrogen to ammonia, the process comprising the step of:

a) contacting molecular nitrogen with a photocatalyst as defined by the first or third aspect of the invention in the presence of water;

wherein step a) is performed under the application of electromagnetic radiation having a wavelength of 270-1000 nm.

As described hereinbefore in relation to the first aspect of the invention, the photocatalysts of the invention are highly active at converting molecular nitrogen from air into ammonia in water under visible light illumination without the need for high temperatures and pressure. Moreover, the catalysts exhibit high catalytic efficiency even without the use of a sacrificial agent (e.g. methanol or formaldehyde). When compared with conventional process that rely on the HB process, producing ammonia in this manner offers the flexibility for the decentralisation of ammonia supply to be used as fertiliser in local farmlands.

The electromagnetic radiation applied in step a) may be advantageously in the form of solar radiation (i.e. sunlight). In an embodiment, step a) is performed under the application of electromagnetic radiation having a wavelength of 300-800 nm. Most suitably, step a) is performed under the application of electromagnetic radiation having a wavelength of 400-700 nm. The photocatalytic process can be advantageously operated under visible light illumination.

In an embodiment, the electromagnetic radiation is supplied to the mixture of step a) using a solar concentrator.

The temperature at which step a) is performed is not particularly limited. In an embodiment, step a) is conducted at a temperature of 5-270° C. Although even greater catalytic activity may be obtained when the process is conducted at high temperature, the inventors have shown that the photocatalyst can achieve impressive quantum efficiency values even when the process is conducted at room temperature, thus presenting obvious industrial advantages. Thus, in an embodiment, step a) is conducted at a temperature of 10-100° C. More suitably, step a) is conducted at a temperature of 10-50° C. Most suitably, step a) is conducted at a temperature of 10-30° C. The thermal energy may be supplied by sunlight. Thus, when step a) is conducted under the application of solar radiation, an additional heat source may not be necessary.

The process may be rendered more performant by using a sacrificial agent in step a), examples of which (e.g. methanol and formaldehyde) will be readily familiar to one of ordinary skill in the art. However, the inventors have shown that the photocatalyst can achieve impressive quantum efficiency values even when the process is conducted in the absence of such a sacrificial agent. In an embodiment, the photocatalyst comprises mol % of a sacrificial agent, relative to the number of moles of the layered base material. Suitably, the photocatalyst comprises mol % of a sacrificial agent, relative to the number of moles of the layered base material.

There are a number of different ways in which the photocatalytic process may be performed.

In an embodiment, the photocatalyst is provided as a fixed bed or a thin film, over (or through) which water and molecular nitrogen are passed.

In an embodiment, the photocatalyst is provided as a suspension (which is optionally agitated) in water, over (or through) which molecular nitrogen is passed (e.g. bubbled).

The photocatalytic process may be performed in a batch manner (e.g. under agitated or stagnant conditions) or a continuous manner (e.g. where a continuous flow of nitrogen is brought into contact with water and the photocatalyst, or where a continuous flow of nitrogen and water is brought into contact with the photocatalyst).

In an embodiment, the process is decentralised, i.e. it is carried out at, or substantially near to, a location where the produced ammonia is to be consumed (e.g. on a farm or other agricultural site).

The following numbered statements 1-60 are not claims, but instead serve to define particular aspects and embodiments of the claimed invention:

1. A photocatalyst comprising:
   a layered base material comprising 1 to 100 layers, the layered base material being selected from the group consisting of molybdenum disulfide, tungsten disulfide, molybdenum telluride, tungsten telluride, molybdenum selenide and tungsten selenide; and
   0.1-10.0% by weight, relative to the weight of the base material, of one or more Group VI, VII, VIII, IX or X transition metals.
2. The photocatalyst of statement 1, wherein the layered base material comprises 1 and 50 layers.
3. The photocatalyst of statement 1, wherein the layered base material comprises 1 and 20 layers.
4. The photocatalyst of statement 1, wherein the layered base material comprises 1 and 10 layers.
5. The photocatalyst of statement 1, wherein the layered base material comprises 1 and 5 layers.
6. The photocatalyst of any preceding statement, wherein the layered base material is molybdenum disulfide.
7. The photocatalyst of any preceding statement, wherein the photocatalyst comprises 0.1-8.0% by weight, relative to the weight of the base material, of one or more Group VI, VII, VIII, IX or X transition metals.
8. The photocatalyst of any preceding statement, wherein the photocatalyst comprises 0.1-6.0% by weight, relative to the weight of the base material, of one or more Group VI, VII, VIII, IX or X transition metals.
9. The photocatalyst of any preceding statement, wherein the photocatalyst comprises 0.5-5.0% by weight, relative to the weight of the base material, of one or more Group VI, VII, VIII, IX or X transition metals.
10. The photocatalyst of any preceding statement, wherein the photocatalyst comprises 1.0-3.0% by weight, relative to the weight of the base material, of one or more Group VI, VII, VIII, IX or X transition metals.
11. The photocatalyst of any preceding statement, wherein the photocatalyst comprises 1.5-2.5% by weight, relative to the weight of the base material, of one or more Group VI, VII, VIII, IX or X transition metals.
12. The photocatalyst of any preceding statement, wherein the one or more Group VI, VII, VIII, IX or X transition metals is selected from the group consisting of Fe, Mn, Co, Mo, Ni, Ru, Rh, Pd and Pt.
13. The photocatalyst of any preceding statement, wherein the one or more Group VI, VII, VIII, IX or X transition metals is selected from the group consisting of Fe, Mn, Co, Ni and Ru.
14. The photocatalyst of any preceding statement, wherein the one or more Group VI, VII, VIII, IX or X transition metals is selected from the group consisting of Fe and Ru.
15. The photocatalyst of any preceding statement, wherein the one or more Group VI, VII, VIII, IX or X transition metals is Fe.

16. The photocatalyst of any preceding statement, wherein the one or more Group VI, VII, VIII, IX or X transition metals is not Co.
17. The photocatalyst of any preceding statement, wherein the size of the one or more Group VI, VII, VIII, IX or X transition metals ranges from single atoms of the transition metals to atomic clusters of the transition metals having a maximum diameter of 4.0 nm.
18. The photocatalyst of any preceding statement, wherein the size of the one or more Group VI, VII, VIII, IX or X transition metals ranges from single atoms of the transition metals to atomic clusters of the transition metals having a maximum diameter of 2.0 nm.
19. The photocatalyst of any preceding statement, wherein the size of the one or more Group VI, VII, VIII, IX or X transition metals ranges from single atoms of the transition metals to atomic clusters of the transition metals having a maximum diameter of 1.0 nm.
20. The photocatalyst of any preceding statement, wherein the photocatalyst further comprises 0.1-50.0% by weight, relative to the combined weight of the base material and one or more Group VI, VII, VIII, IX or X transition metals, of one or more semiconductor materials having an average particle size of 0.5-50.0 nm.
21. The photocatalyst of statement 20, wherein the photocatalyst comprises 1.0-30.0% by weight, relative to the combined weight of the base material and one or more Group VI, VII, VIII, IX or X transition metals, of one or more semiconductor materials having an average particle size of 0.5-50.0 nm.
22. The photocatalyst of statement 20, wherein the photocatalyst comprises 5-15.0% by weight, relative to the combined weight of the base material and one or more Group VI, VII, VIII, IX or X transition metals, of one or more semiconductor materials having an average particle size of 0.5-50.0 nm.
23. The photocatalyst of statement 20, 21 or 22, wherein the one or more semiconductor materials has an average particle size of 0.5-50.0 nm.
24. The photocatalyst of statement 23, wherein the one or more semiconductor materials has an average particle size of 0.5-15.0 nm.
25. The photocatalyst of statement 24, wherein the one or more semiconductor materials has an average particle size of 1.0-10.0 nm.
26. The photocatalyst of any one of statements 20 to 25, wherein the one or more semiconductor materials has the compositional formula $AB_xC_{1-x}$, wherein
    A is selected from the group consisting of Cd, Pb and In;
    B and C are selected from the group consisting of S, Se, Te, As and P; and
    x is a number ranging from 0.01 to 1.
27. The photocatalyst of any one of statements 20 to 26, wherein the one or more semiconductor materials is selected from the group consisting of cadmium sulfide, lead sulfide, cadmium telluride, lead telluride, cadmium selenide and lead selenide.
28. The photocatalyst of any one of statements 20 to 27, wherein the one or more semiconductor materials is cadmium sulfide.
29. The photocatalyst of any preceding statement, wherein the photocatalyst has an average particle size of 0.05-100 μm.
30. The photocatalyst of any preceding statement, wherein the photocatalyst has an average particle size of 0.05-10 μm.
31. The photocatalyst of any preceding statement, wherein the photocatalyst has an average particle size of 0.05-1 μm.
32. The photocatalyst of any preceding statement, wherein the photocatalyst has an average particle size of 0.05-0.5 μm.
33. The photocatalyst of any preceding statement, wherein
    the layered base material is molybdenum disulfide comprising 1 and 20 layers;
    the one or more Group VI, VII, VIII, IX or X transition metals is selected from the group consisting of Fe, Mn, Co, Ni and Ru; and
    wherein the photocatalyst further comprises 1.0-30.0% by weight, relative to the combined weight of the base material and one or more Group VI, VII, VIII, IX or X transition metals, of one or more semiconductor materials having an average particle size of 0.5-50.0 nm.
34. The photocatalyst of any one of statements 1 to 32, wherein
    the layered base material is molybdenum disulfide comprising 1 and 10 layers;
    the one or more Group VI, VII, VIII, IX or X transition metals is selected from the group consisting of Fe, Mn, Co, Mo, Ni, Ru, Rh, Pd and Pt; and
    wherein the photocatalyst further comprises 5.0-15.0% by weight, relative to the combined weight of the base material and one or more Group VI, VII, VIII, IX or X transition metals, of one or more semiconductor materials having an average particle size of 0.5-50.0 nm, wherein the one or more semiconductor materials is selected from the group consisting of cadmium sulfide, lead sulfide, cadmium telluride, lead telluride, cadmium selenide and lead selenide.
35. The photocatalyst of any one of statements 1 to 32, wherein
    the layered base material is molybdenum disulfide comprising 1 and 5 layers;
    the one or more Group VI, VII, VIII, IX or X transition metals is selected from the group consisting of Fe and Ru; and
    wherein the photocatalyst further comprises 5.0-15.0% by weight, relative to the combined weight of the base material and one or more Group VI, VII, VIII, IX or X transition metals, of one or more semiconductor materials having an average particle size of 0.5-50.0 nm, wherein the one or more semiconductor materials is cadmium sulfide.
36. A process for preparing a photocatalyst as defined in any preceding statement, the process comprising the steps of:
    a) providing a dispersion of a layered base material comprising 1 to 100 layers, the layered base material being selected from the group consisting of molybdenum disulfide, tungsten disulfide, molybdenum telluride, tungsten telluride, molybdenum selenide and tungsten selenide; and
    b) contacting the dispersion of the layered base material with a solution of one or more Group VI, VII, VIII, IX or X transition metals.
37. The process of statement 36, wherein the layered base material having between 1 and 100 layers is prepared by exfoliating the base material in its bulk form.

38. The process of statement 37, wherein the base material in its bulk form is exfoliated by:
(i) contacting an aqueous mixture of the base material in its bulk form with an intercalant;
(ii) sonicating the mixture resulting from step (i); and
(iii) isolating the layered base material having between 1 and 100 layers resulting from step (ii).
39. The process of statement 37, wherein the intercalant is selected from the group consisting of hydrazine and lithium.
40. The process of statement 38 or 39, wherein step (iii) comprises:
(iii-a) centrifuging the mixture resulting from step (ii); and
(iii-b) washing and then drying the solid resulting from step (iii-a).
41. The process of any one of statements 36 to 40 wherein the solution of one or more Group VI, VII, VIII, IX or X transition metals is prepared by dissolving one or more Group VI, VII, VIII, IX or X transition metal precursor compounds in a solvent.
42. The process of any one of statements 36 to 40, wherein step b) is conducted at a temperature of 10-325° C., optionally under hydrothermal conditions.
43. The process of statement 42, wherein step b) is conducted at a temperature of 100-200° C., optionally under hydrothermal conditions.
44. The process of statement 42, wherein step b) is conducted at a temperature of 130-190° C., under hydrothermal conditions.
45. The process of any one of statements 36 to 44, wherein the process further includes the step:
c) isolating the photocatalyst resulting from step b).
46. The process of any one of statements 36 to 45, wherein the photocatalyst resulting from step b) is contacted with an aqueous solution of one or more semiconductor materials having an average particle size of 0.5-50.0 nm.
47. A photocatalyst obtainable by the process of any one of statements 36 to 46.
48. Use of a photocatalyst as defined in any one of statements 1 to 35 and 47 in the conversion of molecular nitrogen to ammonia.
49. A photocatalytic process for the conversion of molecular nitrogen to ammonia, the process comprising the step of:
a) contacting molecular nitrogen with a photocatalyst as defined in any one of statements 1 to 35 in the presence of water;
wherein step a) is performed under the application of electromagnetic radiation having a wavelength of 270-1000 nm.
50. The process of statement 49, wherein step a) is performed under the application of electromagnetic radiation having a wavelength of 300-800 nm.
51. The process of statement 49, wherein step a) is performed under the application of electromagnetic radiation having a wavelength of 400-700 nm.
52. The process of statement 49, 50 or 51, wherein the electromagnetic radiation is supplied to the mixture of step a) using a solar concentrator.
53. The process of any one of statements 49 to 52, wherein step a) is conducted at a temperature of 5-270° C.
54. The process of any one of statements 49 to 53, wherein step a) is conducted at a temperature of 10-100° C.
55. The process of any one of statements 49 to 54, wherein step a) is conducted at a temperature of 10-50° C.
56. The process of any one of statements 49 to 55, wherein the photocatalyst is provided as a fixed bed.
57. The process of any one of statements 49 to 55, wherein the photocatalyst is provided as a suspension.
58. The process of any one of statements 49 to 55, wherein the photocatalyst is provided as a thin film.
59. The process of any one of statements 49 to 58, wherein step a) is performed as a batch process.
60. The process of any one of statements 49 to 58, wherein step a) is performed as a continuous process.

EXAMPLES

One or more examples of the invention will now be described, for the purpose of illustration only, with reference to the accompanying figures, in which:

FIG. 1 shows a reaction scheme for $N_2$ fixation to $NH_3$ catalysed by nitrogenase (A) and the mimicking self-ensemble Fe-sMoS$_2$ hybrids (B), respectively. Fe protein containing [4Fe-4S] is shaded in brown colour, MoFe protein is shaded in green and the FeMoco cofactor is shaded in yellow with a ball and stick model of FeMo cluster [8Fe-9S—Mo—C]. Mo, S, Fe, C atoms are shown as balls in blue, yellow, brown, black colour, respectively. (A) shows that Fe protein consumes ATP to produce electrons (e$^-$) and transfers them to FeMoco via outer sphere mechanism. The transferred electrons are thought to migrate along the Fe/Mo—S molecular relay centres for to electron-rich metal centre for $N_2$ reduction. (B) shows that solar energy is supplied to generate excited hole (h$^+$) and e$^-$. The excited electrons are rapidly separated and transferred by the similar Fe—S—Mo units as the 'electronic relays' to electron-rich Fe atoms for $N_2$ reduction by protons from water to ammonia while the excited h$^+$ is relaxed with OH$^-$ from water to produce molecular $O_2$.

FIG. 2 shows the exfoliation of bulk MoS$_2$ and the doping of single transition metal on the obtained single layered MoS$_2$.

FIG. 3 shows atomic force microscopy (AFM) image analyses for the chemically exfoliated sMoS$_2$. (A) AFM image of spin-coated sMoS$_2$ with a scan line, and (B) a model of 2-H MoS$_2$ with 3-layer structure perpendicular to c axis. (C) It can be seen that the step heights of individual layers of 0.6-0.7 nm. This value is comparable to ca. 0.65 nm of a single layer of the S—Mo—S building block as shown in B. Statistical analysis of 100 flakes produced by the lithium exfoliation method revealed that 56% of the flakes to be monolayer, 28% of two layers and 13% of three layers and so on. The average topographic height is around 1.04 nm, which agrees with typical height of a sMoS$_2$ with the presence of water molecules (between 0.6 and 1.0 nm). Sample was prepared by spin-coating sMoS$_2$ onto a surface of Si/SiO$_2$ substrate. The lateral dimension of this sMoS$_2$ nanosheet is approximately 20-40 nm.

FIG. 4 shows the characterization of the basal plane of Fe-sMoS$_2$ and identification of the Fe atoms. (A) HAADF-STEM of the Fe-sMoS$_2$ with a model of single layer 2H—MoS$_2$. Blue and yellow balls represent Mo and S atoms. (B) An atomic resolution HAADF-STEM of the basal plane of Fe-sMoS$_2$; Scan 1 (green line) contains Fe atom on Mo atop site; Scan 2(red line) contains S vacancy substituted by Fe atom; normal sites (blue line) (C) atomic EELS acquired for spots (1),(2) in (A): an EEL edge at 708 eV corresponding to $L_3$ edge of Fe atom. (D) An atomic model based on optimized DFT for a single Fe atom on Mo atop site. (E) An atomic model based on optimized DFT for a single Fe atom substituting a S site. (F and G) ADF intensity line profiles taken along the correspondingly numbered lines (1) and (2), respectively indicated in (B).

FIG. 5 shows DFT optimized geometries of Fe binding configurations and their binding energies. Top, side and perspective views (left to right) of the DFT calculated geometries for Fe on the Mo atop site (A) and S substitution (B). The values are the calculated bond lengths with the unit of Å.

FIG. 6 shows structural analysis of Fe-sMoS$_2$ and its comparative catalytic performance with related systems for photocatalytic ammonia synthesis. (A) Fourier transformed magnitudes of the experimental Fe k-edge EXAFS spectra of samples. (B) Wavelet transformation for the k3-weighted Fe k-edge EXAFS signals of Fe-sMoS$_2$ based on Morlet wavelets with optimum resolutions at the first and higher coordination shells. The intensity reflects the content of scattering signal. (C) An atomic model FeMo—S cluster in FeMo cofactor of FeMoco. The four-membered ring motif of [Fe—S$_2$—Mo] in FeMoco is shaded with green line. (D) An atomic model from optimized DFT of a single Fe on Mo atop site. The same four-membered ring motif of [Fe—S$_2$—Mo] in Fe-sMoS$_2$ is shaded with green line. (E) Catalytic performance of Fe-sMoS$_2$ as compared with other MoS$_2$ systems. Blank represents a blank experiment using CdS quantum dots instead of pre-mixing with Fe-sMoS$_2$ (CdS—Fe-sMoS$_2$) under the same conditions. Reaction conditions: r.t., 10 mL/min of N$_2$, 1 h. Activity was evaluated by averaging at least 3 repeated measurements under the same conditions to generate the measurement errors. Inset figure is the ammonia production of CdS:Fe-sMoS$_2$ as a function of reaction time.

Figure 11:
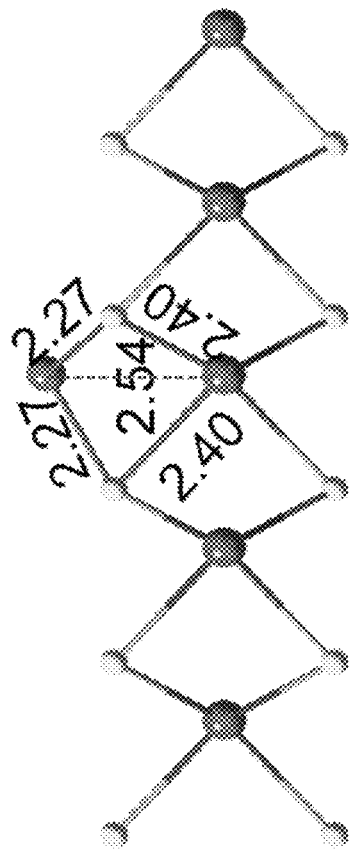
Figure 11:
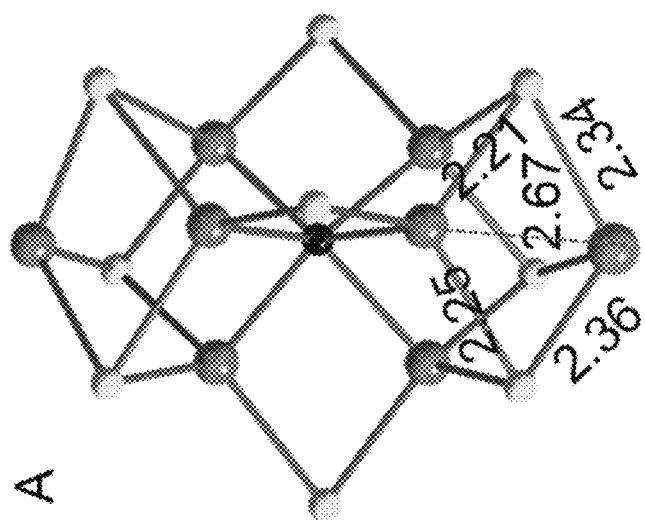

FIG. 11 shows (A) An atomic model FeMo cluster in FeMo cofactor. The four-membered ring of [Fe—S$_2$—Mo] unit in FeMoco is showed with green bond. (B) An atomic model from geometry optimized DFT of a single Fe on Mo atop site with values from EXAFS. The value represents the bond length of FeMoco and Fe-sMoS$_2$ with the unit of Å.

Figure 12:
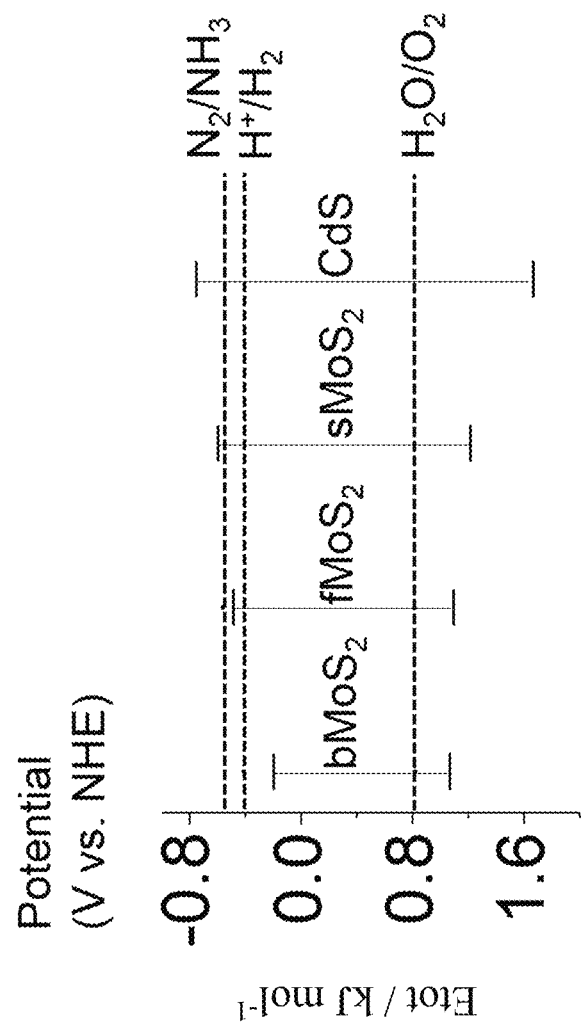

FIG. 12 shows a schematic diagram of energy band potentials of the conduction band (CB) and valence band (VB) of the as-synthesized (bulk) bMoS$_2$, (few layer) fMoS$_2$, ultra-thin MoS$_2$, and CdS at PH=7. The CB and VB values are compared with the potentials of nitrogen reduction and water oxidation[14,15].

Figure 13:
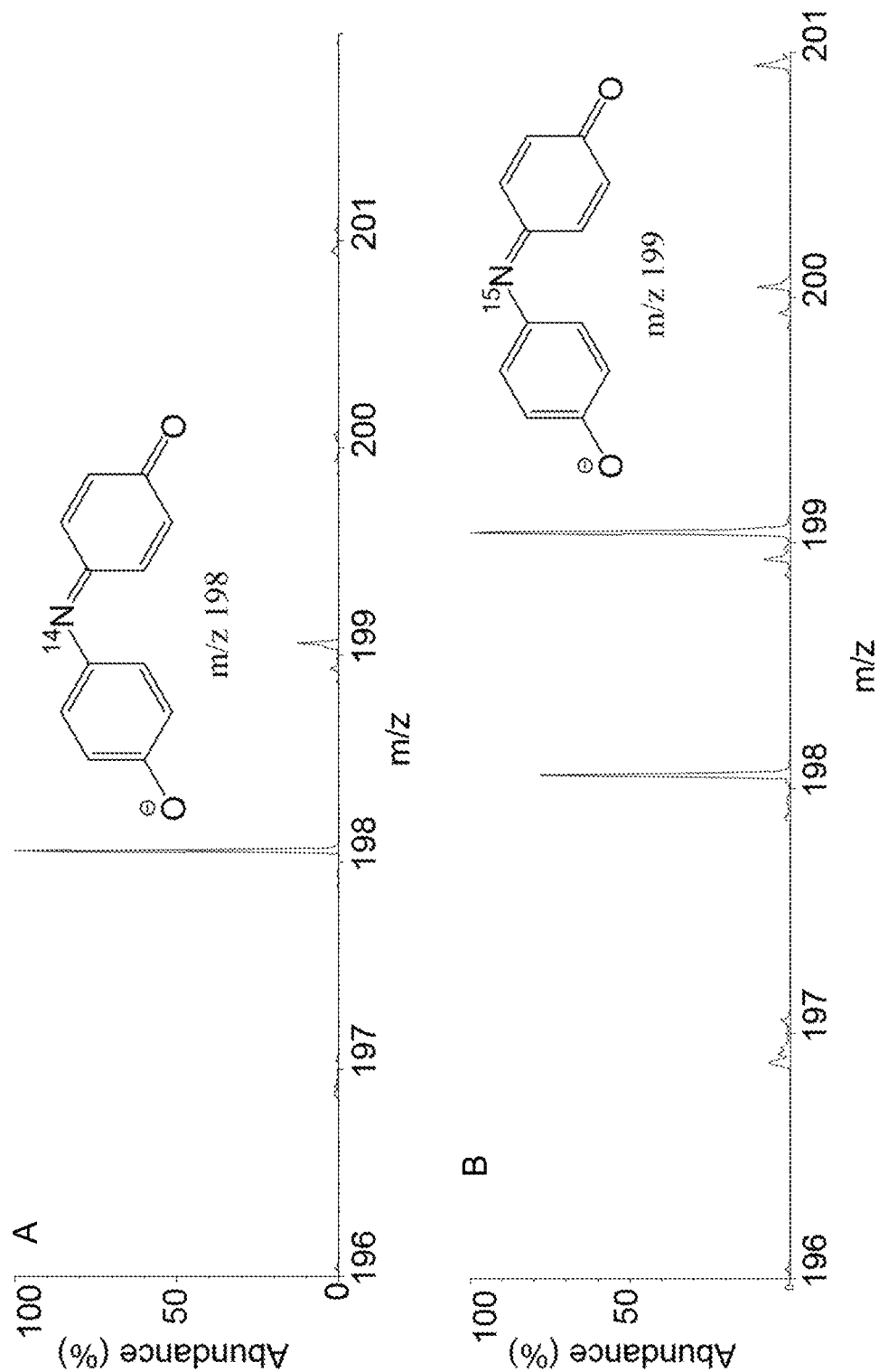

FIG. 13 shows mass spectroscopy of indophenols after reaction with the solution pre-trapped with gaseous product from (A) $^{14}$N$_2$/H$_2$O and (B) $^{15}$N$_2$/H$_2$O over Fe-sMoS$_2$ upon visible light illumination. The aliquot solution (A) shows the formation of condensed indophenol based complex at m/z 198. In contrast, the aliquot solution (B) gives the characteristic $^{15}$N-labelled indophenol based complex at m/z 199 with relative intensity significantly higher than the natural abundance ratio of $^{14}$N:$^{15}$N nuclei. This result clearly confirms that gaseous N$_2$ is fixed into NH$_3$ by the catalyst under light illumination.

Figure 14:
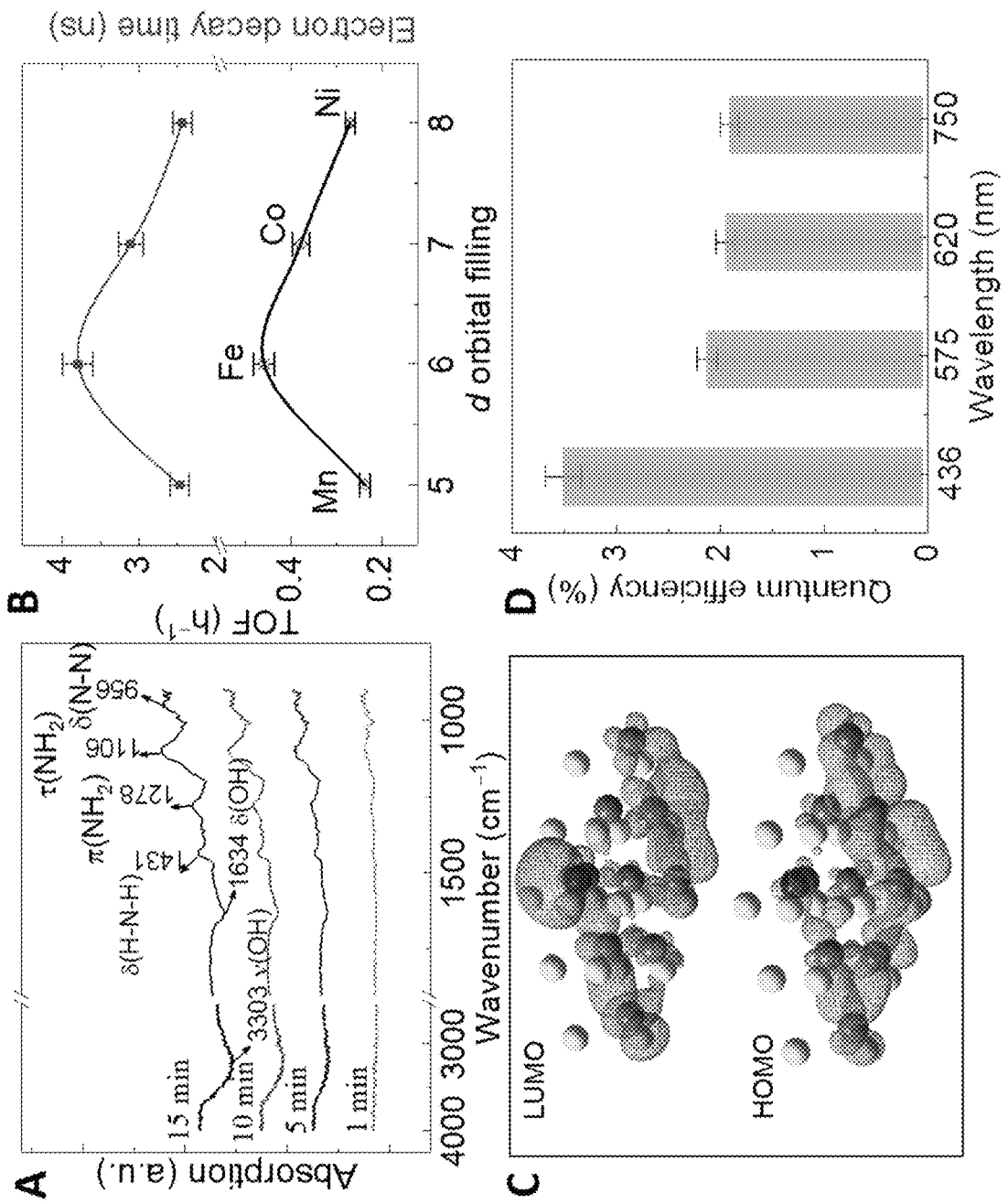

FIG. 14 shows catalytic performance and mechanism study on how the Fe—S$_2$—Mo unit promotes N$_2$ reduction. (A) Time-resolved ATR-FTIR spectra at a flow of N$_2$ and H$_2$O. Time zero was set when light illumination started. (B) Photocatalytic activity for ammonia (and oxygen) production with trace H$_2$ on first-row transition metal doped MoS$_2$ and their electron decay time obtained from time-resolved photoluminescence; (C) Calculated HOMO-LUMO states of Fe-sMoS$_2$. Green net represents positive electron density and brown is negative. (D) Quantum efficiency (Q.E.) of Fe-sMoS$_2$ at 436 nm, 575 nm, 650 nm, and 750 nm, respectively of the incident light.

Figure 15:
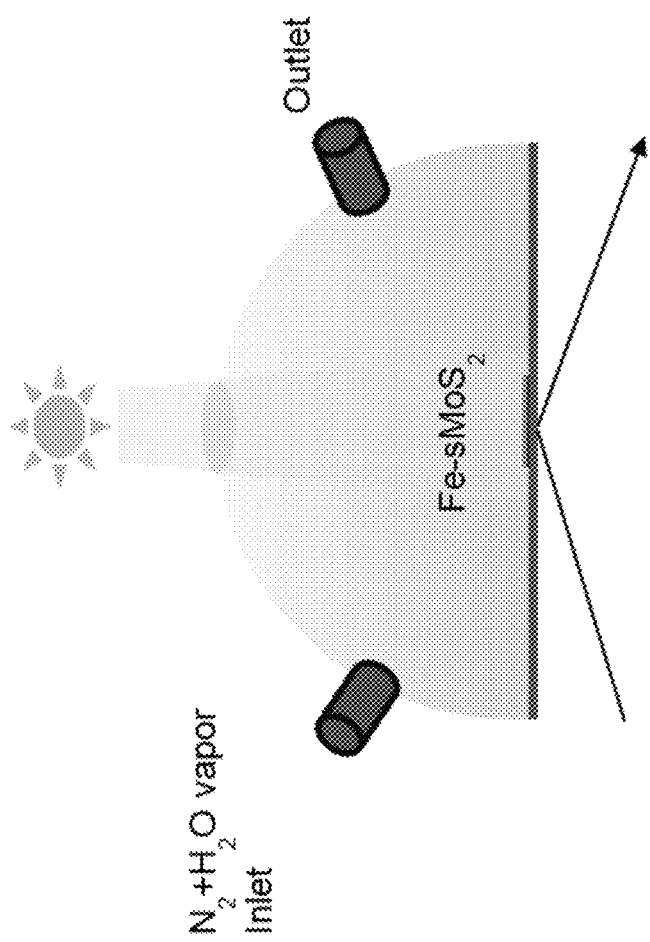

FIG. 15 shows In-situ cell for time-resolved ATR-FTIR.

Figure 16:
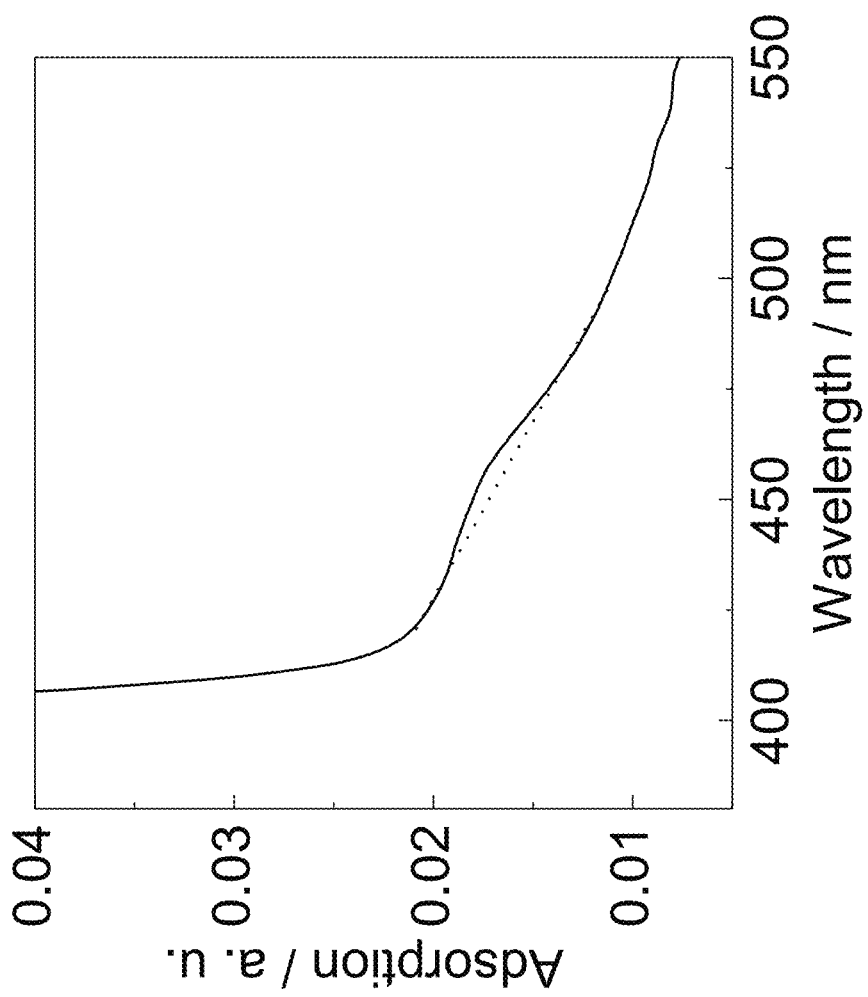

FIG. 16 shows the UV-vis spectrum of the filtered solution with chromogenic agent para-(dimethylamino) benzaldehyde acidic solution).

Figure 17:
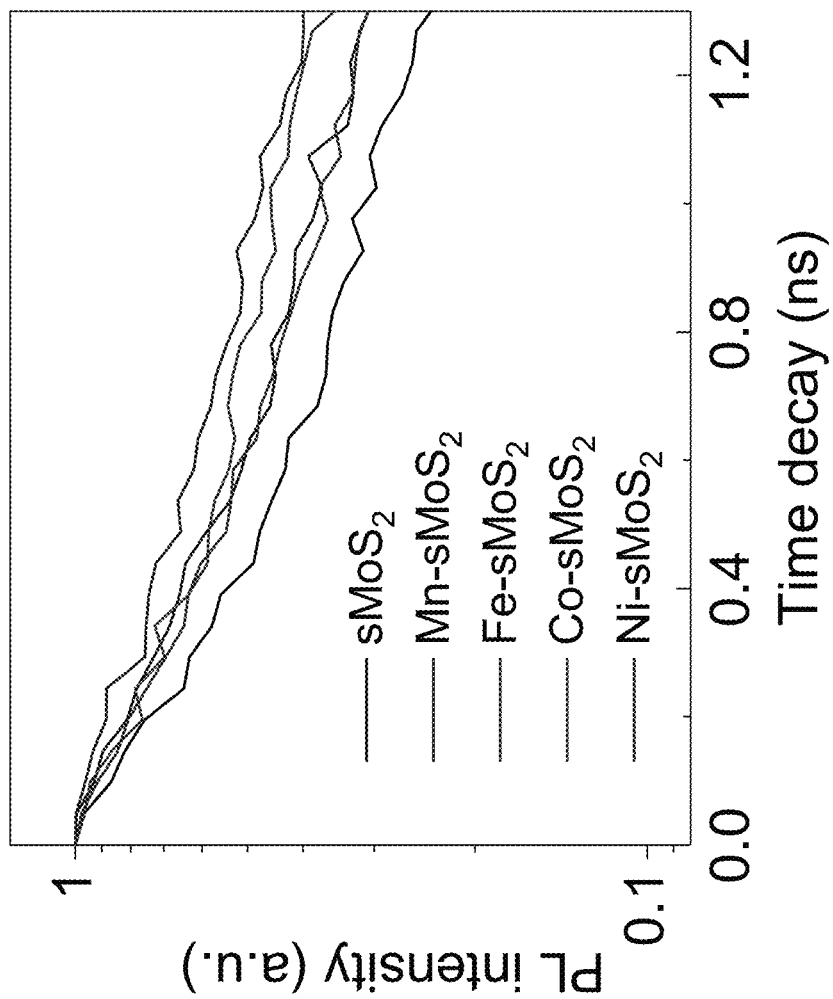

FIG. 17 shows time-resolved photoluminescence of Mn, Fe, Ni-doped sMoS$_2$ and sMoS$_2$, measured using a pulsed Ti:sapphire laser (~150 fs).

Figure 18:
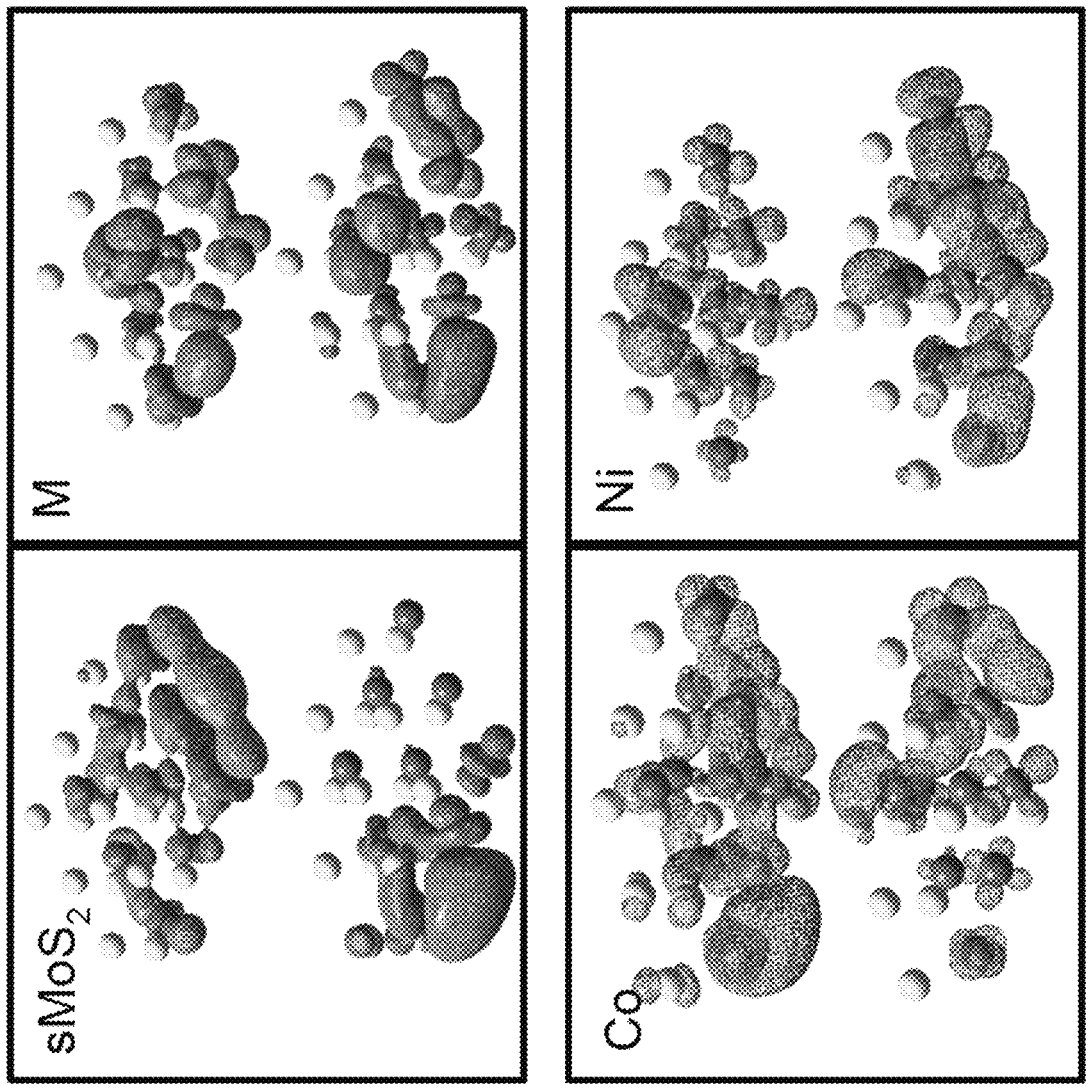

FIG. 18 shows HOMO (down)-LUMO (up) states of sMoS$_2$, Mn, Co, and Ni-sMoS$_2$. Green net mesh is positive electron density and brown is negative.

Figure 19:
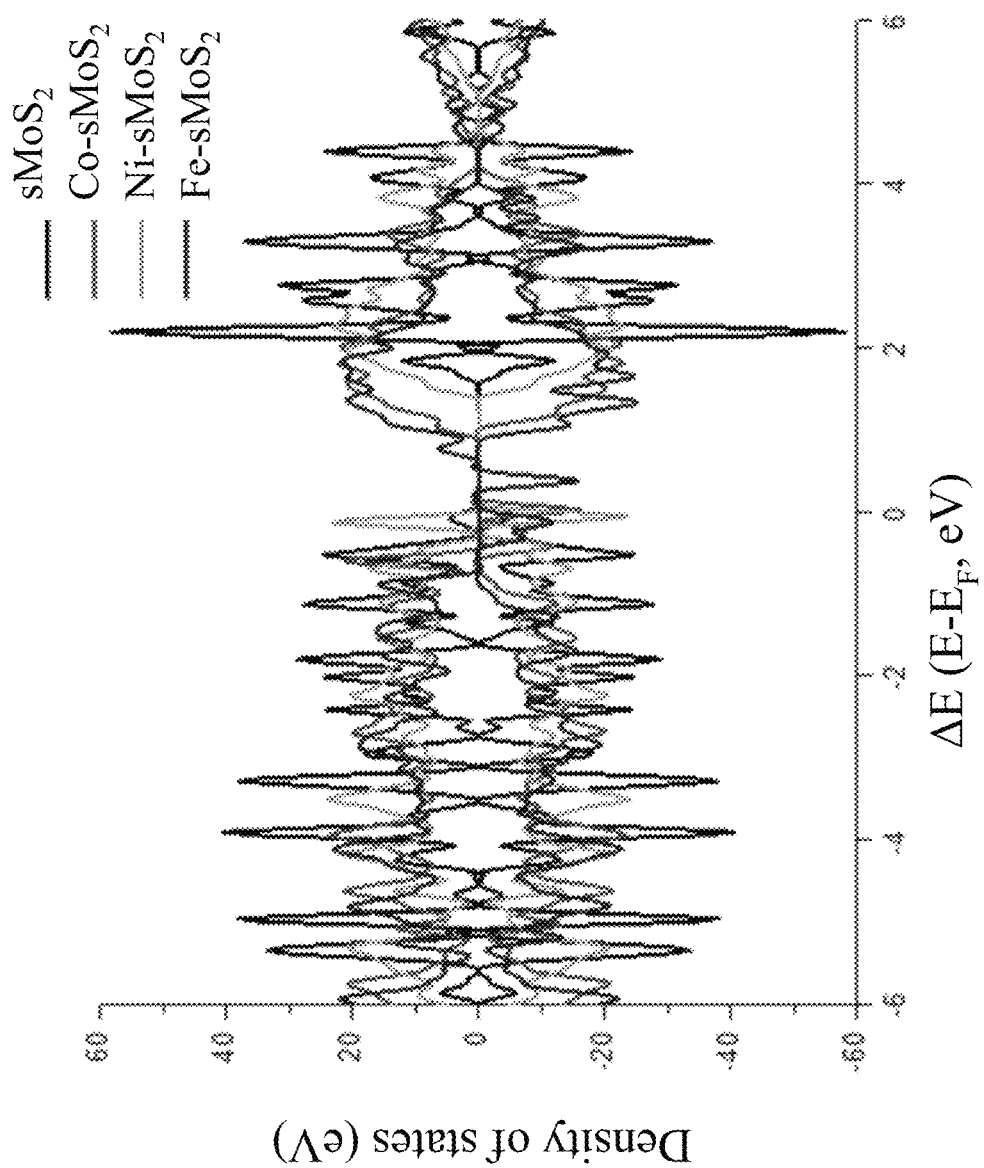

FIG. 19 shows density of status for Fe, Co, Ni doped-sMoS$_2$ and undoped sMoS$_2$.

Figure 20:
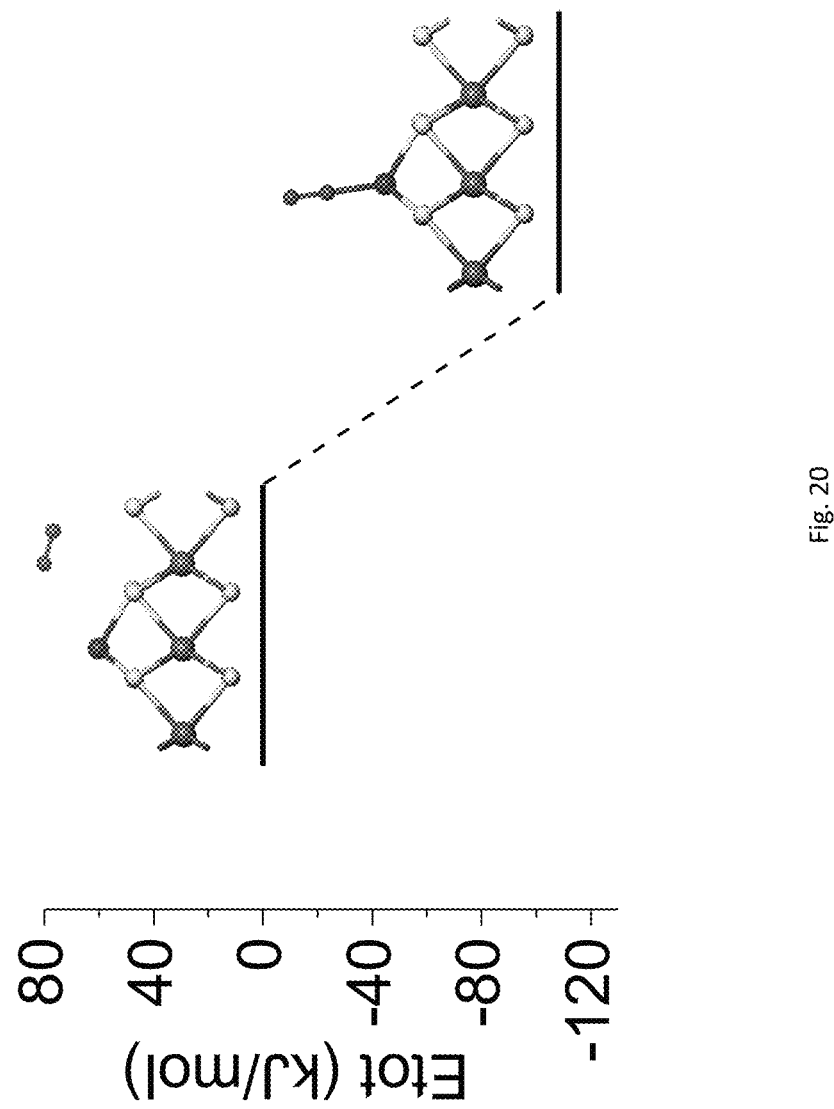

FIG. 20 shows the energy plot of N$_2$ adsorption on Fe-sMoS$_2$ from DFT calculations with the reference to the energies of Fe-sMoS$_2$ and free N$_2$ molecule.

Figure 21:
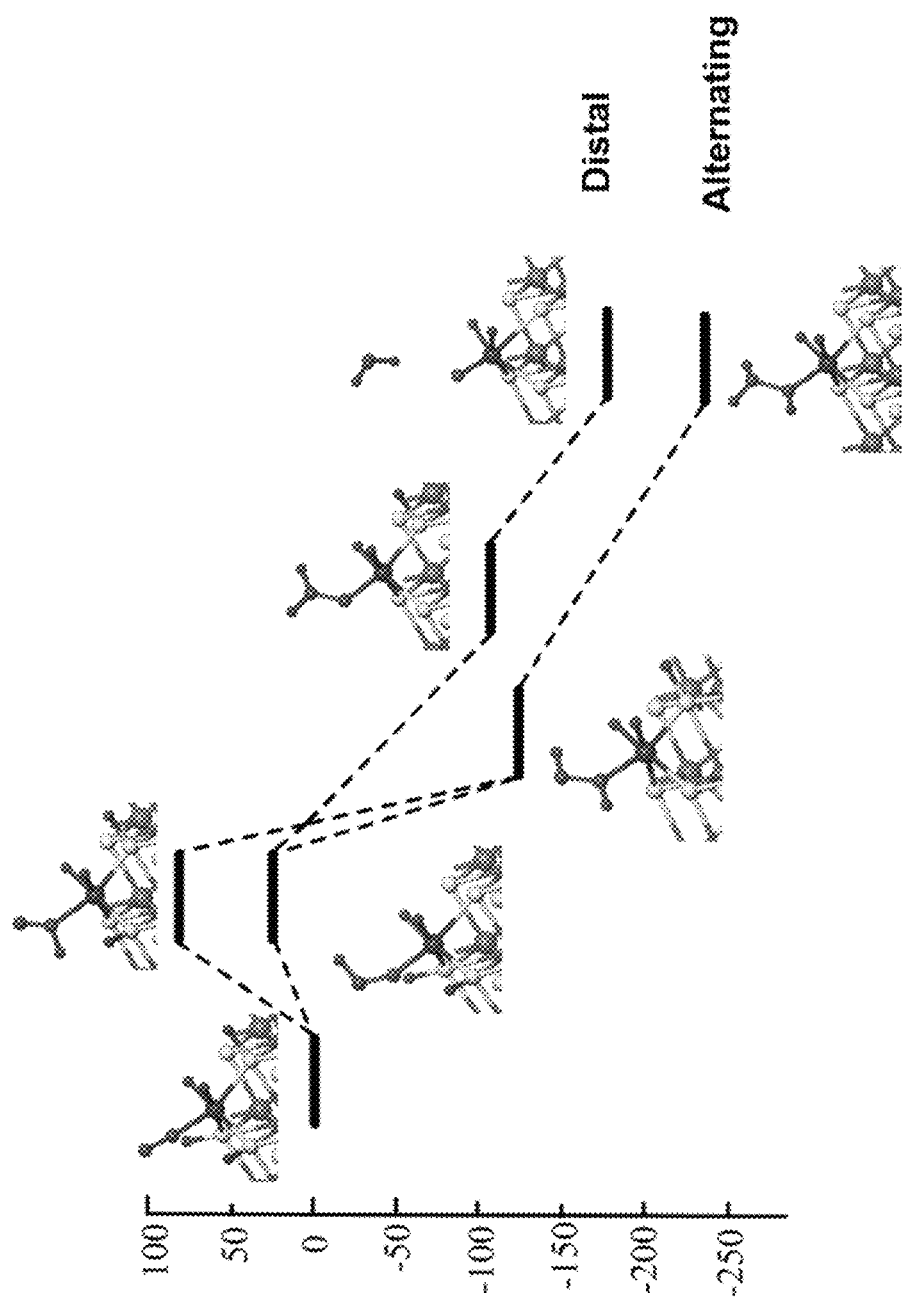

FIG. 21 shows mechanism on how the Fe—S$_2$—Mo unit promotes N$_2$ reduction. Energies of intermediates states in the mechanism of N$_2$ reduction at the Fe-sMoS$_2$ from DFT calculation.

Figure 22:
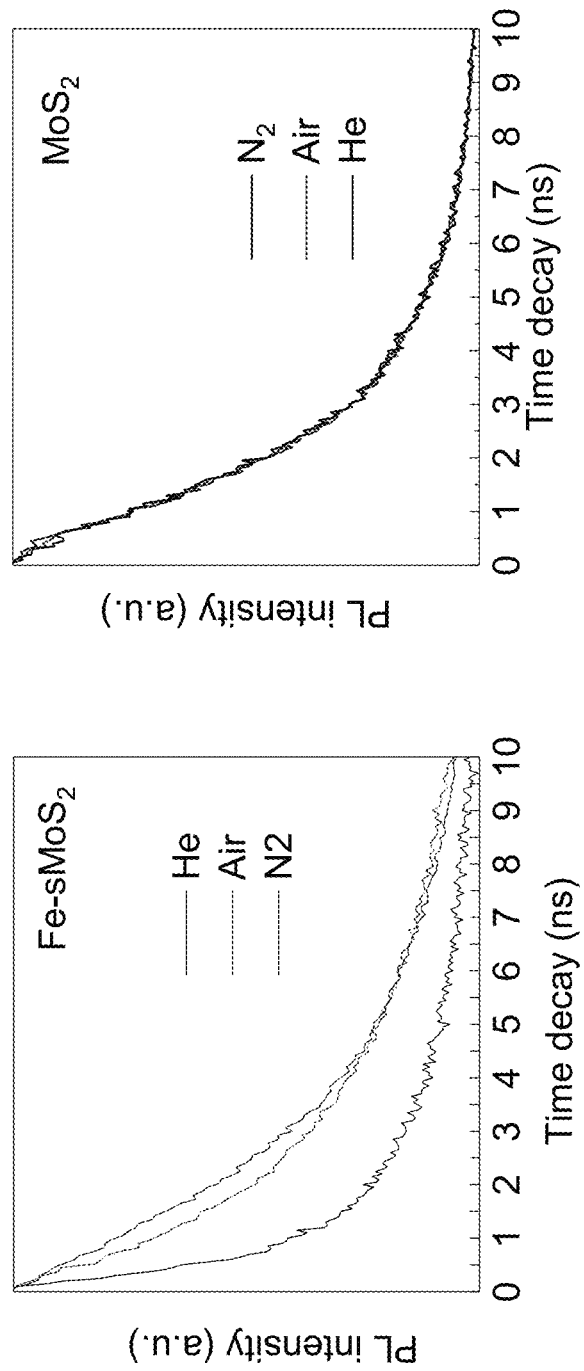

FIG. 22 shows TRPL decay time dependent on nature of gas exposure over transition Fe-doped and undoped MoS$_2$. Adsorption of N$_2$ from air appears to influence the TRPL over the Fe—S$_2$—Mo unit which promotes N$_2$ reduction as discussed in relation to FIG. 21.

1. MATERIALS

Reagents used for synthesis were: MoS$_2$ (Sigma-Aldrich); iron acetate (reagent grade, Alfa Aesar); FeCl$_3$·6H$_2$O (reagent grade, Alfa Aesar); FeCl$_2$ (reagent grade, Sigma-Aldrich); n-butyllithium/hexane (reagent grade, Sigma-Aldrich); Polyvinylpyrrolidone (PVP, reagent grade, Sigma-Aldrich); Potassium acetate (reagent grade, Sigma-Aldrich); Cd acetate (reagent grade, Sigma-Aldrich); Sodium sulfuride (reagent grade, Sigma-Aldrich); Thioglycolic acid (TGA, anhydrous, ≥99.9%, Sigma-Aldrich); KBr (reagent grade, Sigma-Aldrich); hydrazine (puriss. p.a., absolute ≥99.8% (GC), Sigma-Aldrich); isopropanol (99.9%, Sigma-Aldrich); para-(dimethylamino) benzaldehyde (reagent grade, Sigma-Aldrich); H$_2$SO$_4$ (≥98%, Sigma-Aldrich); $^{15}$N$_2$ (98%, CK Isotopes).

2. METHODS

2.1. Synthesis of Few-Layered MoS$_2$ (fMoS$_2$) and Single-Layered MoS$_2$ (sMoS$_2$)

Few-Layered MoS$_2$. 6 g of bulk MoS$_2$ powder was dispersed in 400 mL of Water/Isopropanol (1:3, v/v). 4 mL of hydrazine monohydrate was then added. The solution mixture was placed into the sonication bath for 12 hours for exfoliation, followed by centrifugation at 2000 rpm for 60 minutes. The supernatant collected was filtered using vacuum filtration, followed by washing with water. The exfoliated product was dried under vacuum for 24 hours.

Single-Layered $MoS_2$. 0.5 g of bulk $MoS_2$ powder was soaked in 4 mL of 1.6 M n-butyllithium/hexane under nitrogen atmosphere for 48 hours. Solid $Li_xMoS_2$ was then isolated by vacuum filtration, followed by washing with hexane to remove excess n-butyllithium. It was then dried under vacuum for 24 hours. The dried product was then immersed into 250 mL of water. The solution was placed into the sonication bath for 12 hours and then centrifuged at 5000 rpm for 15 minutes. The supernatant collected was filtered using vacuum filtration, followed by washing with water. The exfoliated product was dried under vacuum for 24 hours.

2.2. Synthesis of Single Fe Atom Doped $bMoS_2/fMoS_2/sMoS_2$

Fe precursor solution was prepared by dissolving 0.2 mM metal ions into 1 mL of 0.5 mM thiourea solution and left for overnight to form a metal complex. The metal complex solution was mixed with 30 mL of colloid solution, which was made by dispersing 30 mg of $sMoS_2$ (b $MoS_2$ or $fMoS_2$) in 30 mL of water/isopropanol (1:3, v/v) and 30 mg of PVP (stabiliser). The solution mixture was then transferred to an autoclave and then placed into an oven at 160° C. for 24 hours. Afterwards, the precipitate was washed with deionized water and dried under vacuum for 12 hours to obtain the solid product.

2.3. Synthesis of $CdS:Fe-sMoS_2$

CdS quantum dots were synthesized according to previous reports with slight modifications[4]. Briefly, 250 uL of TGA was added into 50 mL of Cd acetate (10 mM) aqueous solution, and $N_2$ was bubbled throughout the solution to remove $O_2$ at 110° C. During this period, 1.0 M NaOH aqueous solution was slowly added with adjustment to raise the pH to 11 gradually. Following this step, 5.5 mL of 0.1 M $Na_2S$ aqueous solution was injected into the CdS quantum dots. The reaction mixture was refluxed under $N_2$ atmosphere for 4 h. Finally, the desired CdS quantum dots were obtained and stored in a refrigerator at 4° C. for further use. To load the CdS quantum dots onto the basal plane of $sMoS_2$, 10 mg of $Fe-sMoS_2$ was dipped into 4 mL of CdS quantum dots aqueous solution (0.25 mg/mL) for 1 h.

2.4. Characterisation

High-angle annular dark field scanning transition electron microscopy (HAADF-STEM). The finely ground samples were placed onto the holey carbon coated Cu-TEM grid for analysis. The analysis was performed by JEOL-JEM2100 Aberration-Corrected Transmission Electron Microscope in Birmingham. A voltage of 60 kV to avoid beam excitation and damage was applied for the imaging. An off-axis annular detector imaging was used for Dark-field (Z-contrast) imaging and atomic-resolution imaging. Compositional analysis by X-ray emission detection was also conducted. For the EDX detector, Bruker 5030 SDD detector with a window area of 30 mm$^2$ was used. All results were then processed with Esprit 2.0 software.

Inductively coupled plasma (ICP). The finely ground samples were dissolved and diluted with 5 wt. % HCl for ICP analysis. The analysis was performed by ICP optical emission spectroscopy (Optima2100DV, PerkinElmer). The doped-metal content was controlled at around 3 wt. % with error ±0.5 (Fe 3.3 wt. %, Co 3.0 wt. %, Ni 3.5 wt. %).

Extended X-ray absorption fine structure (EXAFS). Fe K-edge and Mo K-edge X-ray absorption spectra was conducted in fluorescence mode at the BLO7A XAS beamline at NSRRC, Taiwan. To examine the local chemical environment around Fe and Mo atoms, EXAFS data were extracted from XAS spectra. The Demeter ATHENA program was used for XAFS data analysis, where the data were background subtracted, normalised and Fourier transformed. The Demeter ARTEMIS program was used to perform the least-squares curve fitting analysis of the EXAFS χ(k) data. The EXAFS Wavelet analysis was performed following the protocol and calculations developed by Marina Chukalina and Harald Funke, where the backscatter atoms are distinguished within the same atomic shell[16]. To confirm the reproducibility of the experimental data, at least 2 scan sets were collected and compared for each sample. The spectra were calibrated with Fe and Mo foil as reference. The amplitude reduction factor was obtained from analysis of the Fe and Mo foil, which was used as a fixed input parameter to allow refinement in the coordination number and bond distance of the absorption element.

Time-resolved photoluminescence (TRPL) spectroscopy. Photoluminescence spectra and corresponding lifetime of excitons were obtained from a bespoke micro-photoluminescence setup, in which a Ti-Sapphire laser (λ=266 nm, pulse duration=150 fs, repetition rate=76 MHz) was directed onto the sample. Time-resolved measurements were performed using the spectrometer as a monochromator before passing the selected signal to a photomultiplier tube (PMT) detector with an instrument response function width of ~150 ps connected to a time-correlated single-photon counting module. Parameters describing the photoluminescence were obtained by fitting the background-corrected PL spectra with a monoexponential decay function of the form $y=A_1\exp(-x/t_1)+y_0$ for $sMoS_2$. A double-exponential model using equation of $l(t)=A_1\exp(-t/T_1)+A_2\exp(-t/T_2)$ when d orbital metal (Mn, Fe, Co, and Ni) was introduced[17,18].

Attenuated total reflection fourier transform infrared (ATR-FTIR) spectroscopy. In situ ATR-FTIR spectra were collected using a multiple-reflection ATR accessory (PIKE Technologies, custom-modified GladiATR) in a Varian 680-IR spectrometer, controlled by Resolutions Pro software. A trapezoidal Si internal reflection element (IRE, Crystal Gmbh, 8.39×5×1 mm$^3$) with a face angle of 39° was sealed into a polyether ether ketone (PEEK) baseplate using silicone sealant, and a custom cell sealed on top[19]. A layer of water molecules, which were necessary to provide protons, was first pre-adsorbed on the surface from a drop of water onto the catalyst. Subsequently, 50 mL/min of $N_2$ saturated with $H_2O$ was passed over the catalyst while the visible light source was turned on and the IR absorption monitored with an MCT detector over the course of the reaction.

Ultraviolet-visible (UV-vis) absorption spectroscopy. UV-vis absorption spectrum was collected using a Varian 100 Bio UV-Visible Spectrometer in absorbance mode with a step interval of 1 nm. The solution after reaction overnight was filtered. The obtained 5 mL was mixed with 5 mL of 0.14 M para-(dimethylamino) benzaldehyde and 1 M $H_2SO_4$ solution, finally transferred into an optical glass cuvette for hydrazine measurement. The concentration of ammonia solution is also detected using UV-vis spectrum with Nessler's agent.

DFT Theoretical Calculation. All calculations were performed using the first-principles density of functional theory (DFT) as implemented in Vienna ab initio simulation packages (VASP)[20], the exchange-correlation energy functional described by generalized gradient approximation using Perdew-Burke-Ernzerhof (PBE) functional[21], and the ion-electron interaction was treated using the projector-augmented wave (PAW) method[22] with a plane-wave cutoff energy of 400 eV. A (3×3) supercell of 2H—$MoS_2$ was selected to simulate single-layered $MoS_2$ ($sMoS_2$), periodic boundary conditions were employed and 15 Å of vacuum in the z-direction was set to separate neighboring single-layered $MoS_2$. The Brillouin zone has been sampled using a 2×2×1 and an 8×8×4 Monkhorst-Pack[23] grid of k-points for geometry optimizations and orbital analysis calculations, respectively. Both lattice constants and atomic positions were relaxed until the forces on atoms were less than 0.02 eV Å$^{-1}$ and the total energy change was less than $1.0 \times 10^5$ eV. To rationalize the different performance of $sMoS_2$ and transition metal doped $MoS_2$ in catalytic ammonia photosynthesis, density of states and frontier orbitals topology analysis were performed at the PBE/PAW level of theory.

2.5. Ammonia Synthesis Measurement

All photocatalytic activity experiments were conducted at ambient temperature using a 70 W tungsten lamp (Glamox Professional 2000) with UV light cut-off to simulate visible light, respectively. For the fixation of molecular nitrogen, 4 mg of photocatalyst was added into 100 mL of double distilled water in a reactor. The reactor was equipped with water circulation in the outer jacket in order to maintain at room temperature of 25° C. The mixture was continuously stirred in the dark and under visible light with high-purity $N_2$ (99.99%) bubbled at a flow rate of 10 mL/min. Five milliliters of the solution was taken out each 30 min and after filtering to remove the photocatalyst, and the concentration was monitored by colorimetry with the UV-vis spectrometer. For the measurement of ammonia yields, a specialized highly sensitive ammonia detector was used (Thermo Sicentifc™ Orion™ Ammonia Gas Sensing ISE Electrode). Quantum efficiency measurements were carried out under a 300 W Xenon lamp through quartz windows using bandpass filters of 437±10 nm, 575±25 nm, 650±20 nm, and 750±20 nm.

Isotopic $N_2$ was used to prove that the obtained ammonia derives from $N_2$ gas rather than some other sources. Indophenol assays were prepared by adding 0.5 mL of aliquot solution after 1-h reaction to 0.1 mL of 1% phenolic solution in 95% ethanol/water. Stepwise, 0.375 mL of 1% NaClO in alkaline sodium citrate solution and 0.5 mL of 0.5% Na[Fe(CN)$_5$NO] solution were added. The assayed aliquots were aged overnight before analyzing on a Xevo LCMS-ESI system.

3. RESULTS AND DISCUSSION

3.1. Synthesis

Figure 1:
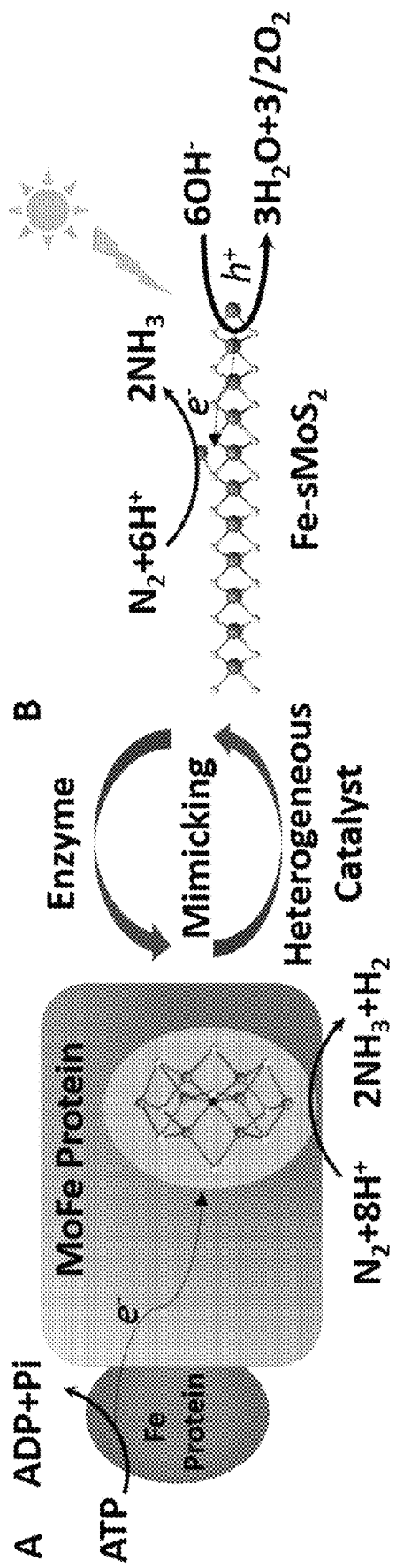
Figure 2:
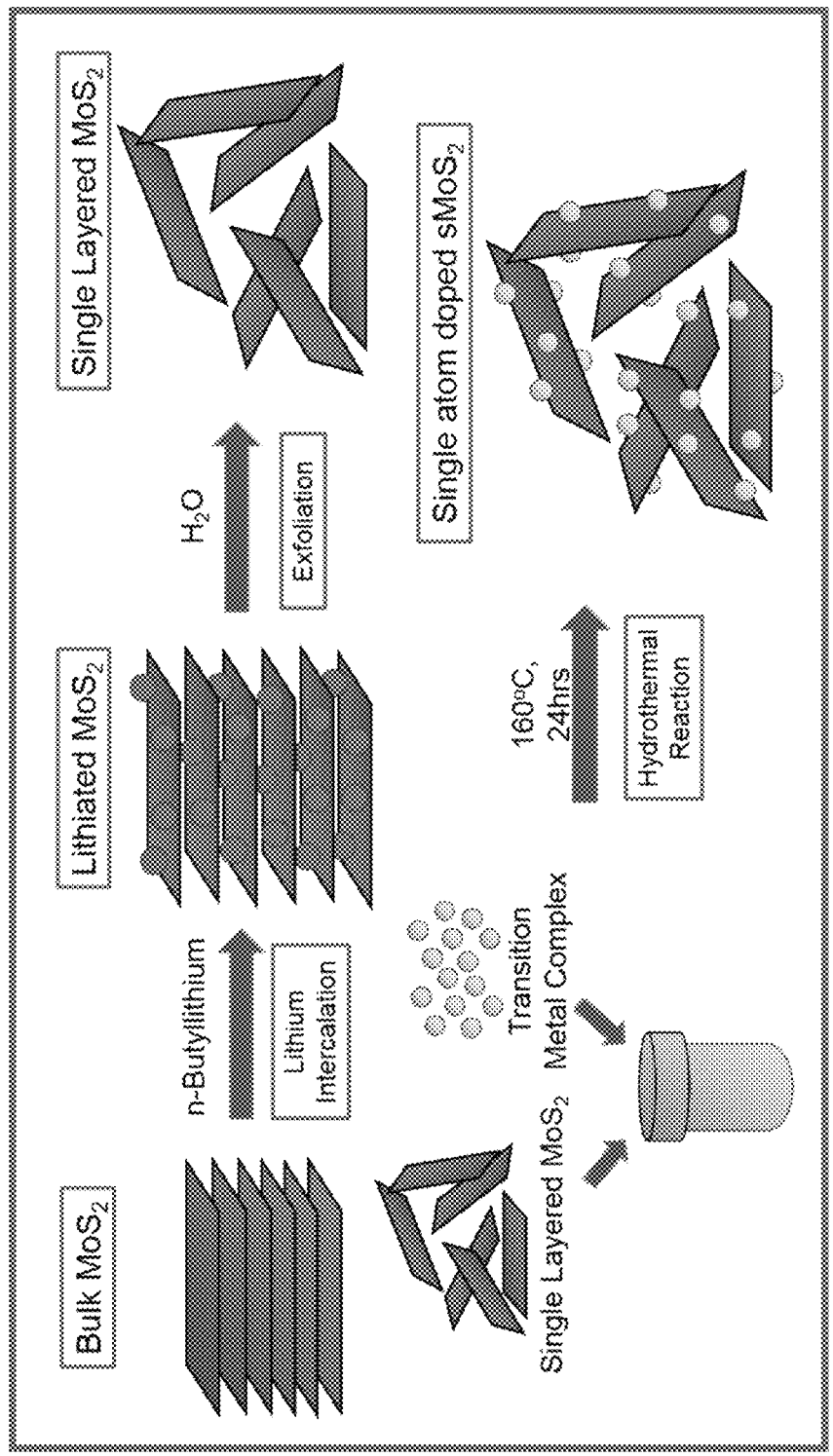

The 2-D single molecular layer $MoS_2$ (termed $sMoS_2$) consisting of three-sub-layers of S—Mo—S in a trigonal prismatic 2-H structure was first synthesized via exfoliation of bulk $MoS_2$ using n-butyllithium. Subsequently Fe atoms were attached to $sMoS_2$ using a hydrothermal method for in-situ formed sulphide species (FIGS. 2 and 3), followed by $H_2$ reduction to afford the molecular Fe-$sMoS_2$ in nanosize. In this synthesis, Fe atoms were atomically dispersed and assembled onto the basal plane of $sMoS_2$.

Similar transition metal-doped catalysts were prepared in the same manner using Mn, Co or Ni instead of Fe.

3.2. Characterisation

Figure 3:
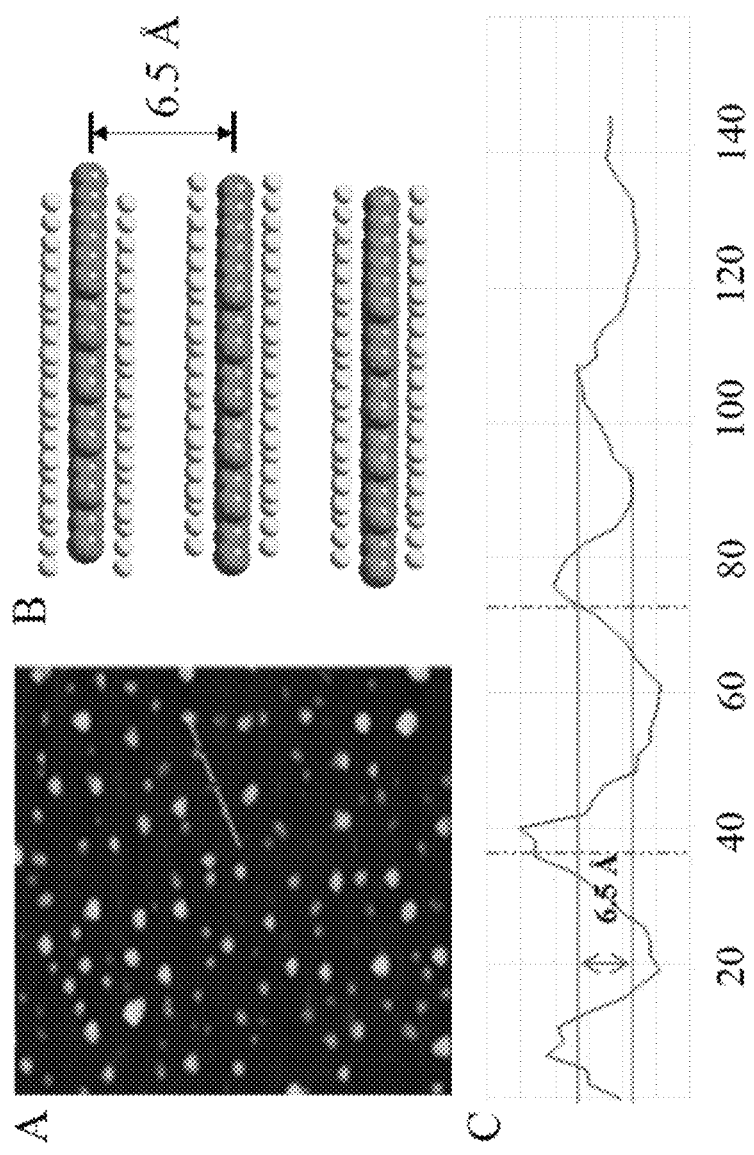
Figure 4:
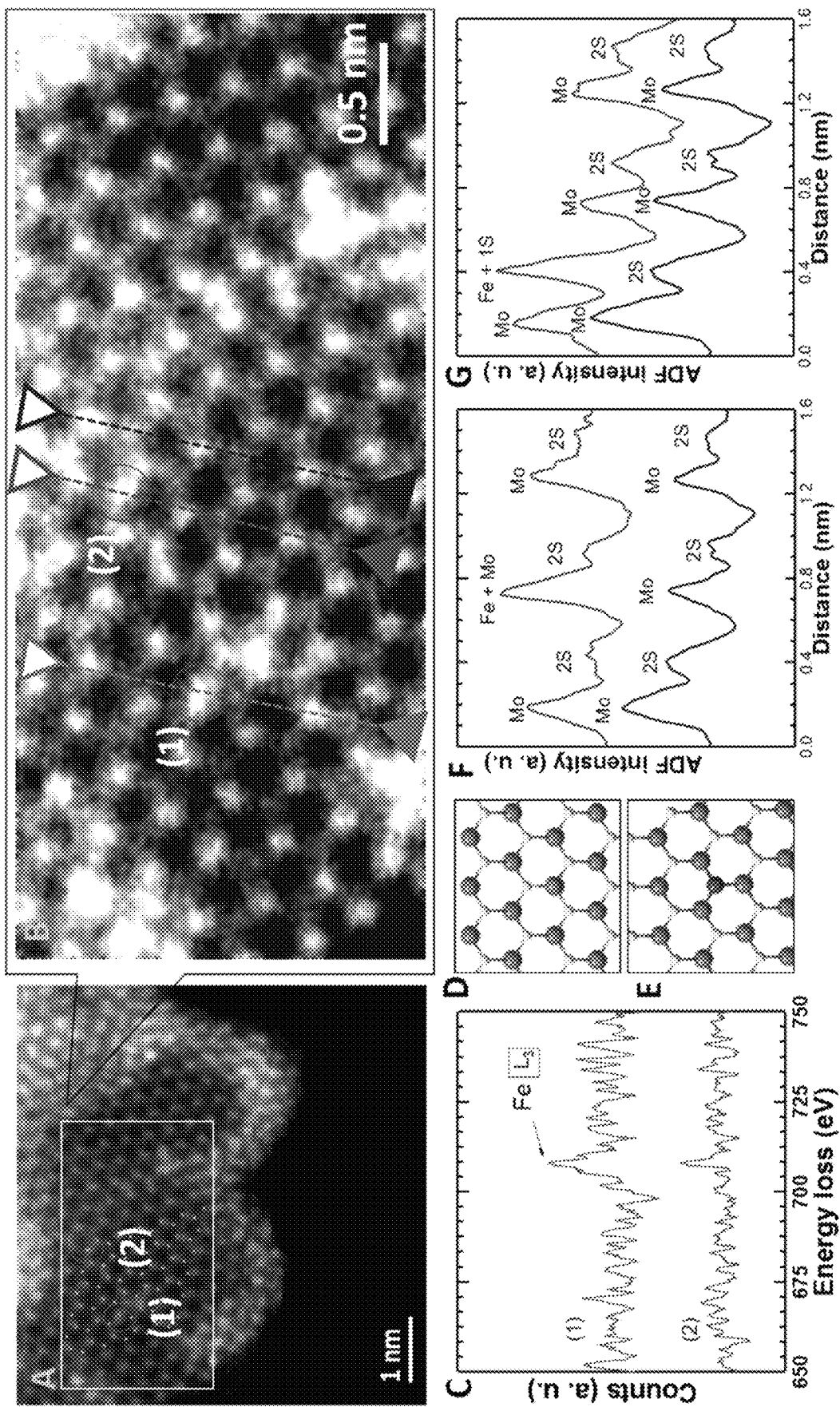

FIG. 4A shows a typical high-angle annular dark-field scanning transmission electron microscopy (HAADF-STEM) image of Fe-$sMoS_2$ with corresponding 2-H characteristic pattern. As revealed from the distinctive brighter spots than the surrounding Mo and $S_2$ sites in 2-H arrangement in FIG. 4A (red circles) and the enlarged image FIG. 4B show that individual Fe atoms are uniformly dispersed and overlap the position of Mo and S sites in the structural motif of 2H-$sMoS_2$. To further confirm the nature of this adsorbed atom, atomic resolved electron energy loss spectroscopy (EELS) were performed on these brighter spots. The EEL spectra (FIG. 4C) at the corresponding positions demonstrate the presence of Fe atoms with the characteristic signature $L_3$ edge at 708 eV[24]. The images for HAADF-STEM and EELS analysis show that isolated Fe atoms are deposited at the two favoured positions in the basal plane of $sMoS_2$. A typical intensity profile analysis of the HAADF shown in FIG. 4F demonstrates that a Fe atom commonly takes residence on atop site of Mo of the basal plane. Occasionally, as shown in FIG. 4G, an Fe atom can be found in the position of S site as substitution. The corresponding structural models shown in FIGS. 4D and 4E based on DFT calculations also confirm the existence of these two energetic favoured atomic positions (FIG. 3).

Figure 5:
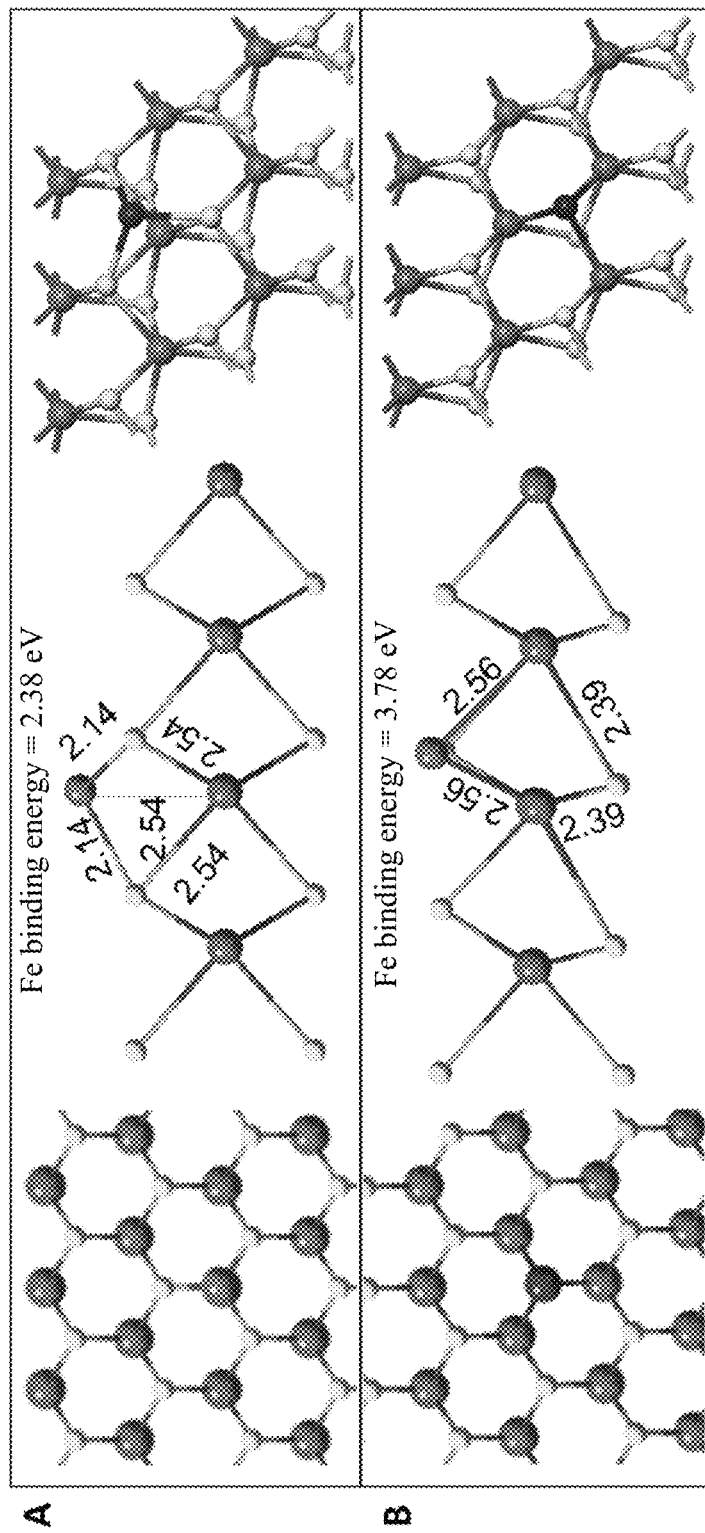
Figure 6:
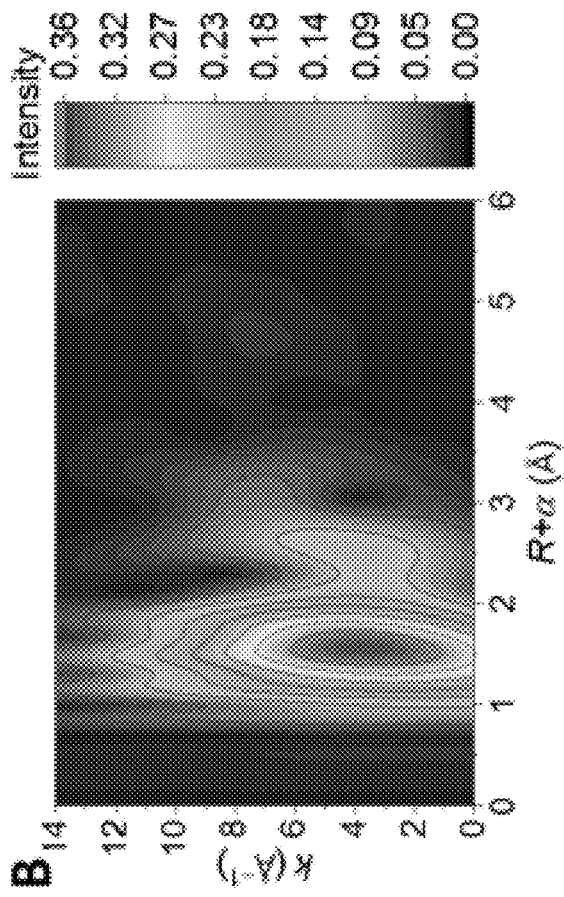
Figure 6:
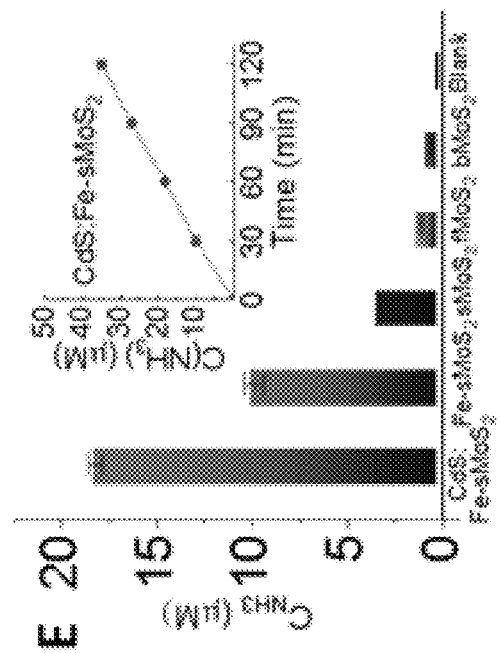
Figure 6:
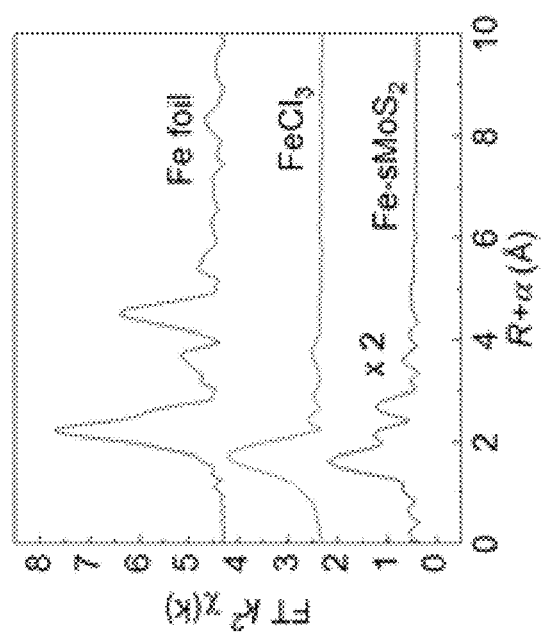
Figure 7:
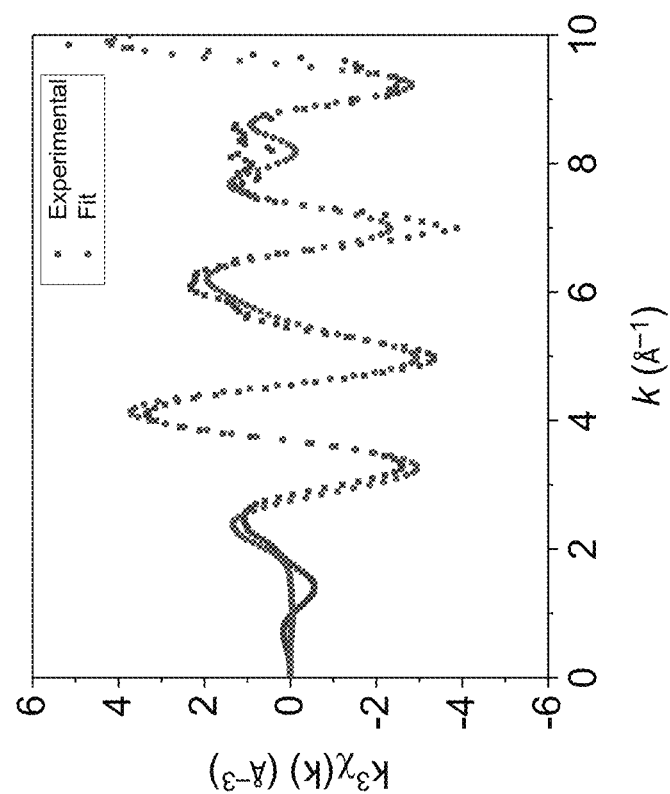
FIG. 7 shows the k3 EXAFS curves at Fe K edge in k for Fe-sMoS$_2$.

As shown in k3-weighted Fourier transformed spectra in the extended X-ray absorption fine structure (EXAFS) for Fe post-k edge analysis of Fe-$sMoS_2$ (FIG. 6A), there are clearly Fe—S contributions at a distance of 1.7 Å for Fe-$sMoS_2$, which is distinctively different from the Fe—Fe contributions at a distance of 2.2 Å calibrated by Fe foil. The distance is close to the Fe—Cl contributions in $FeCl_3$, indicating that Fe is atomically isolated as revealed by HAADF-STEM images shown in FIGS. 4A and 4B. There is a small but new peak at 2.1 Å attributed to Fe—Mo interaction, which is agreeable to the envisaged bonding environment of Fe atop to the Mo site on 2-H $sMoS_2$ and the theoretical model from the DFT calculations (FIG. 6D). Similarly, the small peak at 2.7 Å can be attributed to the long Fe—S bonds where Fe substitutes into the S site (FIG. 6E, see model in FIG. 5). The EXAFS curve fit matches with the expected coordination number of the nearest sulfur atoms around the isolated Fe atom of 2.9±0.3 with the distance of 2.1 Å, and the nearest Mo atoms around the isolated Fe atom is 1±0.2 according to the atop model (FIG. 7 and Table 1).

TABLE 1

The fitted coordination environment of Fe in $sMoS_2$

| Scattering Path | Enot (eV) | R (Å) | CN | D-W factor |
|---|---|---|---|---|
| Fe—S | −5.7 | 2.27 ± 0.02 | 2.9 ± 0.3 | 0.010 |
| Fe—Mo | 1.1 | 2.54 ± 0.03 | 1.0 ± 0.2 | 0.003 |
| Fe—S' | −5.7 | 3.08 ± 0.03 | 3.7 ± 0.4 | 0.010 |

"CN" is coordination number; "D-W" is Debye Waller (thermal atomic uncertainty); R is the bond length; Enot is the energy difference between theoretical and calculated scattering path.

R factor=1.3%; Kwt=1,2,3; k range 3-10; No Fe—Fe bonds can be fitted in the first 2 shells, indicating the Fe species are in form of single atoms.

Figure 8:
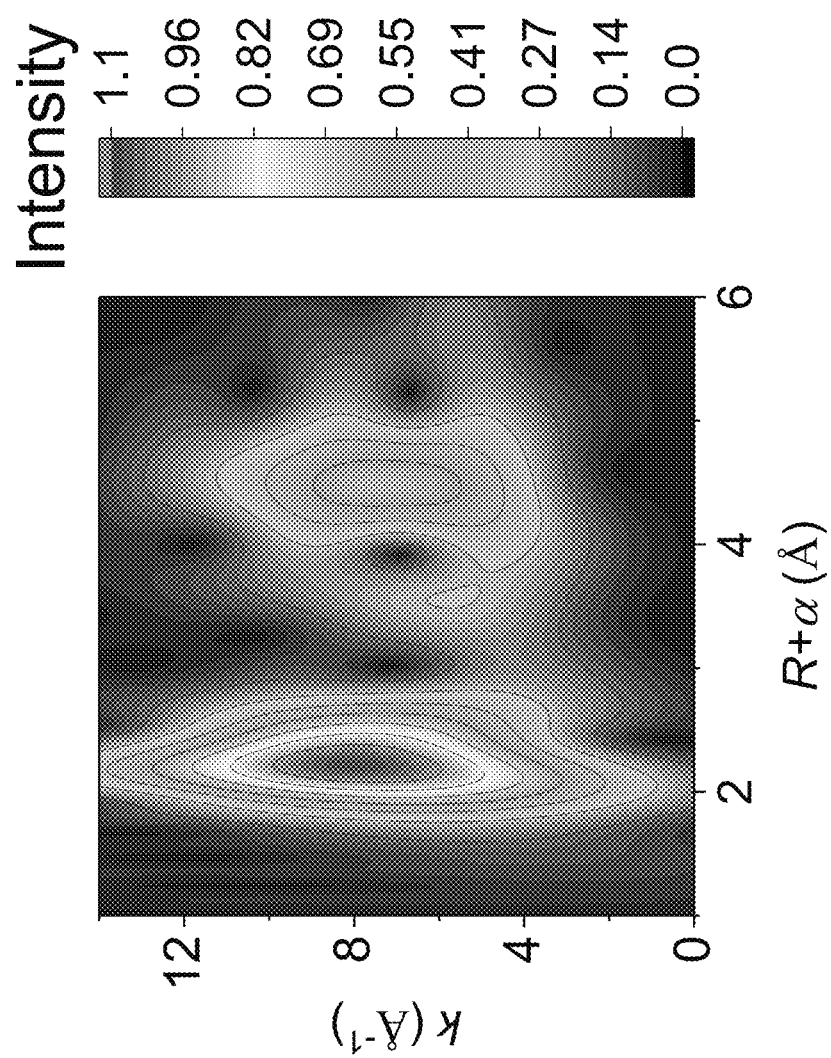
FIG. 8 shows wavelet transforms for the k3-weighted Fe k-edge EXAFS signals of Fe foil based on Morlet wavelets with optimum resolutions at the first and higher coordination shells. The intensity reflects the content of scattering signal.

FIG. 6B shows the WT-EXAFS wavelet transformed analysis based on Morlet wavelets, which can be used to differentiate closely-related spatial interactions[25]. For Fe-sMoS$_2$, the hot spot of the WT maximum at ~3 Å$^{-1}$ is well-resolved at the first coordination shell, which can clearly be related to the Fe—S bond at atop site. In contrast, the WT intensity hot spot at ~8 Å$^{-1}$ region corresponding to the Fe—Fe bond was not detected in Fe-sMoS$_2$, which indicates the sole dispersion of individual Fe atoms in Fe-sMoS$_2$ (FIG. 8). In addition, there is an associated weak asymmetry WT intensity area ranging from 2-3 Å for Fe-sMoS$_2$, which is attributed to the mixed contributions of Fe—Mo bonds and longer Fe—S bonds at the S substitution sites (reference to FIG. 5). It is noted that the WT intensity for this Mo atop site is much stronger than that of the S substitution site, demonstrating that this is the principle site for the Fe, as reflected by the HAADF-STEM analysis.

Figure 9:
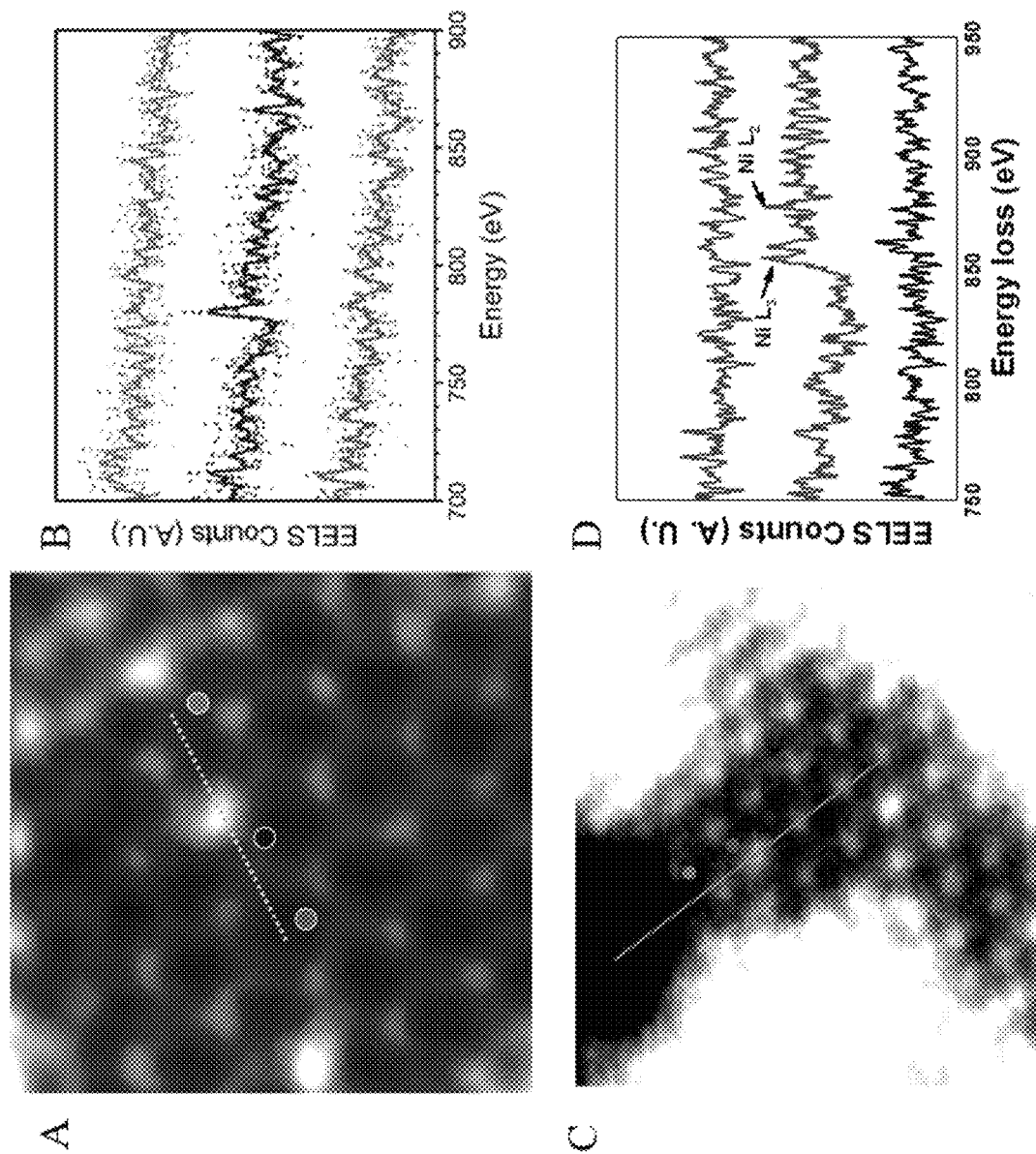
FIG. 9 shows HAADF-STEM images of Co-sMoS$_2$. (A) Co at the Mo-atop site model, (B) EELS acquired along the line in (A). (C) Ni at the Mo-atop site model and (D) EELS acquired along the line in (C).

Similar structure was obtained for Co and Ni-doped sMoS$_2$ at comparable doping levels (FIG. 9).

Figure 10:
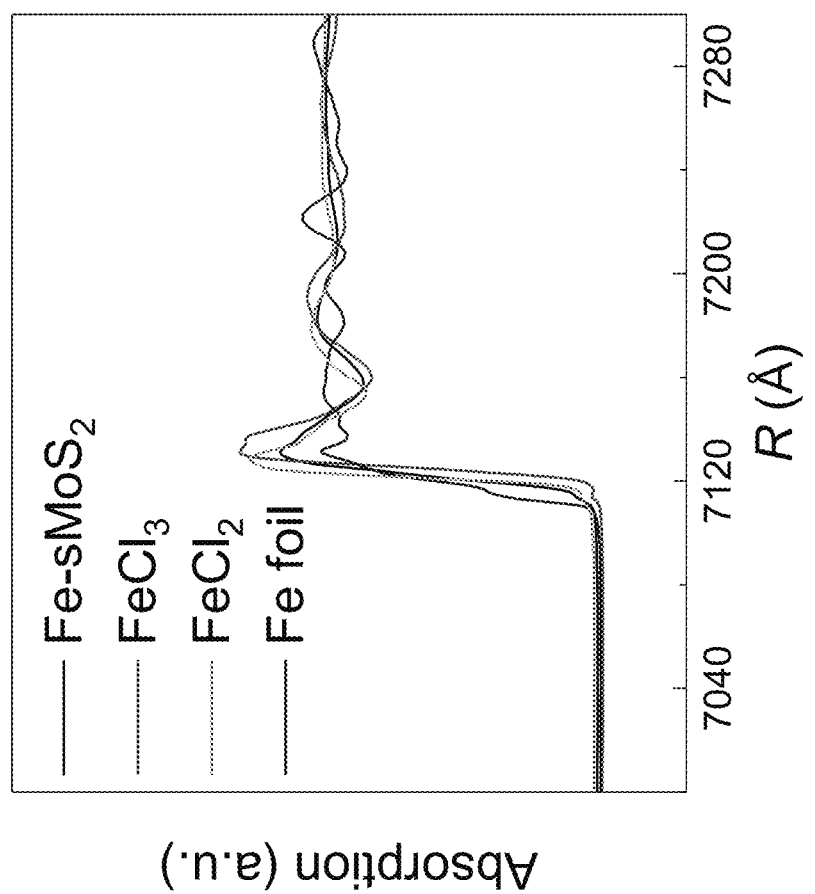
FIG. 10 shows Fe k edge XANES spectra for atomically dispersed Fe-sMoS$_2$. Fe foil, FeCl$_2$, and FeCl$_3$ are used as references.

X-ray absorption near-edge structure (XANES) analysis was also carried out to better understand the single-atom Fe-sMoS$_2$ catalyst. As shown in FIG. 10, the Fe k-edge XANES spectrum of quenched Fe-sMoS$_2$ from photocatalysis is drastically different from that of metallic Fe foil (Fe$^0$), but its absorption edge in the right-shift position between Fe$^{II}$Cl$_2$ and Fe$^{III}$Cl$_3$ implying that the average working oxidation state is between them for the anchored Fe.

The molecular models of FeMoco and Fe-sMoS$_2$ shown in FIG. 6C and FIG. 6D, respectively illustrate their similar structural motifs of the four-membered [Fe—S$_2$—Mo] rings. Interestingly, the derived Fe—S, Mo—S and Fe—Mo bonding lengths of the [Fe—S$_2$—Mo] in this single layer molecular Fe-sMoS$_2$ catalyst are extremely close to that of the reported molecular [Fe—S$_2$—Mo] unit in FeMoco from single crystal data within the average deviations of 10%[28] (see Table S2(2), FIGS. 5 and 11).

TABLE 2

The bond lengths of [Fe—S$_2$—Mo] in FeMoco and Fe—sMoS$_2$ on basis of EXAFS experiments in comparison with optimised DFT calculations.

| Bond species | Bond length (Å) | | |
| --- | --- | --- | --- |
| | FeMoco | Experiment | Calculation |
| Fe—S1 | 2.248 | 2.27 ± 0.02 | 2.137 |
| Fe—Mo | 2.666 | 2.54 ± 0.03 | 2.539 |

TABLE 2-continued

The bond lengths of [Fe—S$_2$—Mo] in FeMoco and Fe—sMoS$_2$ on basis of EXAFS experiments in comparison with optimised DFT calculations.

| Bond species | Bond length (Å) | | |
| --- | --- | --- | --- |
| | FeMoco | Experiment | Calculation |
| Fe—S2 | 2.213 | 2.27 ± 0.02 | 2.136 |
| Mo—S1 | 2.356 | 2.40 ± 0.01 | 2.542 |
| Mo—S2 | 2.336 | 2.40 ± 0.01 | 2.542 |

3.3. Conversion of N$_2$ to NH$_3$

FIG. 6E confirms that Fe-sMoS$_2$ with [Fe—S$_2$—Mo] is active to convert N$_2$ to NH$_3$ via photo-activation to provide excited electrons for the N$_2$ fixation in H$_2$O at ambient conditions. Bulk MoS$_2$ is shown to be inert for N$_2$ reduction presumably because of its conduction band (CB) is more positive than that of the N$_2$/NH$_3$ redox couple[27] (see FIG. 12). By reducing the layers of MoS$_2$, the activity for nitrogen fixation to ammonia is gradually enhanced. It has been proven that the band gap of MoS$_2$ could be enlarged with a more negative CB edge striding over the N$_2$/NH$_3$ redox couple[27,28]. In addition, indirect band excitation over few-layer MoS$_2$ can be switched to a more efficient direct band excitation for single layer MoS$_2$[29]. While the single layered MoS$_2$ materials display a negligible activity in H$_2$/O$_2$ splitting from water by visible light, a substantial higher photocatalytic ammonia production rate is recorded. Notably, the introduction of the [Fe—S$_2$—Mo] motifs into the basal planes of single layered MoS$_2$ displays a far more superior activity for ammonia and (stoichiometric oxygen) production from N$_2$ and H$_2$O reaction with trace hydrogen gas formation than most recent reported photocatalysts in visible light regime (Table 3), thereby mimicking the FeMoco.

TABLE 3

Comparison of photocatalytic ammonia synthesis over Fe—sMoS$_2$ and CdS—Fe—sMoS$_2$ along with others from recent literature

| Entry | Sample | Activity (µmol/g/h) | Light source | Reactant/reagent | Reference | Published year |
| --- | --- | --- | --- | --- | --- | --- |
| 1 | Fe—sMoS$_2$ | 249 | 70 W UV cut-off tungsten lamp | N$_2$, H$_2$O | This work | — |
| 2 | CdS—Fe—sMoS$_2$ | 459 | 70 W UV cut-off tungsten lamp | N$_2$, H$_2$O | This work | — |
| 3 | FeS$_2$/CNT | ~67 | Xenon lamp | N$_2$, H$_2$O | (30) | 2018 |
| 4 | JRC-TIO-6 (TiO$_2$) | 0.7 | 300 W Hg lamp (280-420 nm) | N$_2$, H$_2$O | (37) | 2017 |
| 5 | Fe—TiO$_2$ | 10 | 360 W Hg lamp | N$_2$, H$_2$O/HCl | (32) | 1977 |
| 6 | BiOCl | 68.9 | 500 W Xenon lamp | N$_2$, H$_2$O/CH$_3$OH | (33) | 2015 |
| 7 | 5% Ru@n-GaN NWs | 120 | 290-380 nm UV irradiation | N$_2$, H$_2$ | (34) | 2017 |
| 8 | W$_{18}$O$_{49}$ | 195.5 | 300 W Xenon lamp | N$_2$, H$_2$O/Na$_2$SO$_3$ | (35) | 2018 |

Light driven nitrogen fixation over solid catalysts in aqueous medium has been intensively studied with continual interests. $TiO_2$ has been receiving considerable attention due to its outstanding photochemical properties but the wide band gap of 3.2 eV denies the direct ammonia production by visible light activation. As a result, modified $TiO_2$ materials to reduce the band gap or include promotors to capture visible light have been commonly applied. Despite these attempts, low activities for photo ammonia production using visible light are generally obtained. The low levels of ammonia can be seen from the typical modified $TiO_2$ such as entries 4 and 5 (Table 3) where a significant quantity of ammonia is produced due the use of unfiltered light source with UV component. Other semi-conductive oxide-based materials such as BiOCl and $W_{18}O_{49}$ (entries 6 and 8 in Table 3) are also known to capture visible light for ammonia production but they show low activities, presumably due to poor charge separation (short lifetime for exciton recombination) from lack of rapid charge separation component for these structures. It should be particularly noted from entry 7 (Table 3) that 5% Ru@n-GaN NWs is a promising material, which exhibits higher ammonia production activity by using $N_2/H_2$ at room temperature. In contrast with the recent literature, Fe-sMoS$_2$ with [Fe—S$_2$—Mo] motifs on 2-D single layered MoS$_2$ show the highest ammonia production activity from direct visible light activation without using sacrificial reagent (see entries 1 and 2 in Table 3). This indicates its unique structure for the efficient charge separation and activation of $N_2$ in visible light and water for the ammonia production.

Although only a small quantity of photocatalyst was made, it is sufficient to cover more than 6 m$^2$ of farmland per gram of catalyst assuming the leaching rate of 100 kg N ha$^{-1}$ for a selected crop is used. This value for decentralised photocatalytic ammonia fertilizer production was estimated as follows:

Assuming the highest leaching rate of 100 kg N ha$^{-1}$ (1 ha=10,000 m$^2$) per year of a selected crop (see K. Sieling, et al. Journal of Agricultural Science, Cambridge (1997), 128, 79-86).

Thus, the leaching N rate=0.714 mole N/m$^2$/yr.

The photo-catalyst produces 500 μmol N/g/h=500×24×365=4.38 mole N/g/yr.

The depleted-N area replenished per gram of catalyst=4.38/0.714=6.134 m$^2$/g.

Isotope labelled $^{15}N_2$ was used to track the nitrogen source of ammonia, which confirmed that gaseous $^{15}N_2$ was fixed by this FeMoco-like Fe-sMoS$_2$ (FIG. 13). Interestingly, further activity promotion by incorporation of light-captured CdS quantum dots to Fe-sMoS$_2$ can be achieved. The rate for $N_2$ reduction to $NH_3$ maintains for at least 120 min under constant illumination without showing any obvious attenuation (FIG. 6E inset). It is expected that the CdS quantum dots can contribute additional electron-hole pairs from visible light illumination, the significant activity enhancement reflects their efficient charge separation by the [Fe—S$_2$—Mo] motifs in Fe-sMoS$_2$ at the materials interface.

The dynamic $N_2$ reduction to $NH_3$ over Fe-sMoS$_2$ was also studied using in-situ ATR-FTIR with light illumination (FIGS. 14A and 15). The IR absorption bands of 3303 and 1634 cm$^{-1}$ shown in FIG. 14A can be attributed to the O—H stretching and H—O—H bending of adsorbed water molecules, respectively on the catalyst structure. Their decreasing signals from background as a result of the consumption of the adsorbed water molecules upon the light illumination in $N_2$. Simultaneously, four bands at 1431, 1278, 1106, and 956 cm$^{-1}$ were arisen, which can be attributed to the H—N—H bending, —NH$_2$ wagging, —NH$_2$ twisting, and N—N stretching of adsorbed N$_2$Hy (2≤y≤4) species, respectively[36]. Notably, the latter species suggest that the $N_2$ reduction on the Fe-sMoS$_2$ may follow the association pathway under the light illumination. The content of hydrazine was analysed using para-(dimethylamino) benzaldehyde acidic solution, which gave a small but detectable peak at around 450 nm in UV-vis spectroscopy, as shown in FIG. 16. This indicates that the formation of $N_2H_4$ from $N_2$ reduction, which forms a complex with the benzaldehyde compound[37]. Thus, the Fe-sMoS$_2$ appears to undertake the same association pathway for $N_2$ fixation as that of nitrogenase with both structures containing the common motifs of four membered [Fe—S$_2$—Mo] rings.

To prove the unique feature of [Fe—S$_2$—Mo] in photocatalytic ammonia production, the activities of some selected first-row transition metal analogues were compared and are shown in FIG. 14B. The same volcano activity relationship for typical ammonia production rate from $N_2$ reduction with respect to d orbital filling and position at the optimal value of Fe is presented. Time resolved photoluminescence (TRPL) spectra of sMoS$_2$, Mn, Fe, Co, and Ni-doped sMoS$_2$ are also shown in FIGS. 14B and 17. As seen from the TRPL spectra, the instantly generated excited electrons and holes in sMoS$_2$ annihilate rapidly within a few nanoseconds. Doping single transition metal atoms onto this structure apparently increases their recombination time, suggesting that the metal exerts an enhanced degree of charge separation by accepting excited electrons. Mn and Ni-doped sMoS$_2$ show a similar exciton lifetime, followed by Co-sMoS$_2$. Interestingly, Fe-doped sMoS$_2$ with optimal d-band filling and position also gives the longest excitons lifetime with the slowest PL decay curve. Notably, the rank of their lifetimes (Table 4) shows a strong inverse relationship with photocatalytic activity for ammonia production (FIG. 14B). It is anticipated that the prolonged excitons lifetime is critical to allow chemical reactions of the excitons to occur before they recombine for relaxation, leading to photocatalytic $N_2$ fixation. Thus, the Fe-doped sMoS$_2$ with the Fe—S$_2$—Mo motifs displays the best combination of metal site and 'electron relay' components for charge separation analogously to that in the biological system.

TABLE 4

Fitted decay time from TRPL over transition metal-doped and undoped MoS$_2$

| Sample | $\tau_1$ | $\tau_2$ | T(ns) |
| --- | --- | --- | --- |
| sMoS$_2$ | 0.72 | — | 0.72 |
| Mn—sMoS$_2$ | 0.51 | 3.02 | 2.47 |
| Fe—sMoS$_2$ | 0.61 | 4.31 | 3.79 |
| Co—sMoS$_2$ | 0.32 | 3.33 | 3.11 |
| Ni—sMoS$_2$ | 0.47 | 2.93 | 2.44 |

T (average), $\tau_1$, and $\tau_2$ represents the decay times for two components, which is fitted with a double-exponential model using equation of $I(t) = A_1 \exp(-t/\tau_1) + A_2 \exp(-t/\tau_2)$ when d orbital is introduced. On the contrary, sMoS$_2$ was fitted with one exponential model.

3.4. Mechanistic Studies

For $N_2$ activation over nitrogenase, it was suggested from theoretical calculations that $N_2$ could linearly bind to either the molybdenum atom over the distal pathway (hydrogenation starts at terminal N), or the iron atom over the alternating pathway (hydrogenation starts at N in proximity to Fe) in the FeMoco[9]. The electron states of HOMO and LUMO and band structures in Mn, Fe, Co, and Ni-doped sMoS$_2$ were then modelled (FIGS. 14C, 18, and 19).

As shown in FIG. 18, the HOMO and LUMO orbitals concentrate on the edge of sMoS$_2$ with relatively low electron delocalization, verifying the highly active edge site of s-MoS$_2$ as that reported in literature. Transition metal atom doped distinctly improves the degree of delocalization of the frontier orbitals, especially to their LUMO, the frontier orbitals delocalization follows the order: Fe>Co>Mn≈Ni. The higher degree of delocalization indicate the more stable population of photo-excited electrons in LUMO orbitals, thus accounting the longer lifetime for the recombination of excited photo-generated electrons and photo-generated holes. This is in good agreement with the TRPL experimental results. Among them, the LUMO orbital distribution over the Fe atom in Fe doped sMoS$_2$ should be noted (FIG. 14D). Particularly, they demonstrate that excited electrons could be transferred from valence band to conduction band of sMoS$_2$ via the conductive Fe—S$_2$—Mo motifs and resided on to the Fe atom during the photo-exciting process to enter to the anti-bonding orbital of absorbed N$_2$ molecule and thus facilitating the hydrogenation reaction of N$_2$ for ammonia production. On the other hand, the density of state calculation indicates a smaller band gap of Fe doping sMoS$_2$ relative to other catalyst materials, which is also favorable for electron transfer from HOMO to LUMO by photo-excitation.

Clearly, excited electrons from CB of sMoS$_2$ after photo-excitation show a strong propensity to transfer and accommodate at Fe$_1$ atom than other transition metals. According to further DFT calculations, it was also found that wherever N$_2$ was placed on Fe$_1$ atom doped sMoS$_2$ slab, the N$_2$ adsorption was always converged onto the Fe$_1$ atom in [Fe—S$_2$—Mo] as the end on mode spontaneously (FIG. 20). Once the electronegative N$_2$ moiety is taken up by the Fe$_1$ atom excited electrons during visible light illumination are expected to retain to further prolong the exciton lifetime for subsequent protons reduction to ammonia on the N$_2$—Fe$_1$ against the typical fast recombination of excitons from this layer structure, which substantially promotes the N$_2$ to NH$_3$ reaction over H$_2$O photolysis without in contact with nitrogen gas. In addition, the nitrogen fixation to ammonia on the Fe$_1$ over [Fe—S$_2$—Mo] appeared to go through the alternating pathway (FIGS. 21 and 22), indicating the similarity in mechanism for both non-biological and biological processes in ammonia synthesis.

It is generally recognized that ammonia synthesis at nitrogenase follows an associative pathway without breaking N≡N triple bonds directly in transition state. N$_2$ adsorption and the following first proton and electron reactions of adsorbed N$_2$ (formation of *N$_2$H) are two key steps in this non-dissociative reduction of N$_2$. The energy plots in FIG. 14D and FIG. 21 then show that the first hydrogenation step by adding hydrogen atom is the most challenging step with the energy going uphill. Hydrogenating the proximal N to Fe is found to be less favourable with a higher energy state whereas, the species from hydrogenating the terminal N is relative stable. The following hydrogenation steps can be separated into two pathways: distal and alternating as shown in the FIG. 21. The intermediate species via the latter pathway is more stable compared with that via the former pathway. Based on the energy plots, the nitrogen fixation to ammonia over [Fe—S$_2$—Mo] sites through the alternating pathway appears to be more energetically favoured despite the higher activation barrier in the first hydrogenation step.

Quantum efficiency (Q.E.) for photon to hydrogen in ammonia is the key parameter to evaluate the conversion efficiency of renewable light energy. FIG. 14D shows that the Q.E. of this nitrogenase-mimic Fe-sMoS$_2$ can be up to 3.5% at 436 nm, which is believed to be the highest value reported in photo-ammonia synthesis.

2.5. Conclusion

In conclusion, a bio-inspired solid structure consisting of nitrogenase-like [Fe—S$_2$—Mo] four membered rings in 2D single layer of MoS$_2$ is for the first time synthesized. The material mimics the nitrogenase enzyme, which shows the strong ability to reduce N$_2$ to NH$_3$ in aqueous solution under mild conditions with visible light illumination where excited electrons from the sMoS$_2$ slab are conducted to the redox active Fe site through the [Fe—S$_2$—Mo] as the electron relay units. Introduction of light-sensitive CdS quantum dots can further boost the NH$_3$ harvest. From DFT calculations and ATR-FTIR analysis, the [Fe—S$_2$—Mo] motif is clearly shown to carry out an associative mechanism in converting N$_2$ to NH$_3$. N$_2$ prefers to bind linearly on the Fe atom in the [Fe—S$_2$—Mo], which will undergo stepwise hydrogenations to NH$_3$ with the successive formation of hydrogen atom from H$^+$/e$^-$ pairs. Thus, the photocatalytic method for ammonia synthesis over this type of materials although small in quantity may open up an exciting possibility for the decentralization of ammonia supply for fertilizer to local farmlands.

While specific embodiments of the invention have been described herein for the purpose of reference and illustration, various modifications will be apparent to a person skilled in the art without departing from the scope of the invention as defined by the appended claims.

REFERENCES

1. Avenier, P. et al. Dinitrogen dissociation on an isolated surface tantalum atom. *Science* 317, 1056-1060 (2007).
2. Liu, J. et al. Nitrogenase-mimic iron-containing chalcogels for photochemical reduction of dinitrogen to ammonia. *Proc. National Acad. Sci.* 113, 5530-5535 (2016).
3. IFA, 2007 Annual Production and International Trade Statistics. (Series of statistical reports on the 2007 production capacity, production and international trade of key fertilizers, raw materials and intermediates see www.fertilizer.org/ifa/HomePage/STATISTICS. 2008.
4. Hoffman, B. M. et al. Mechanism of nitrogen fixation by nitrogenase: the next stage. Chem. Rev. 114,4041-4062 (2014).
5. Gray, H. B. & Ellis Jr, W. R. Electron transfer. *Bioinorganic Chemistry*. Sausalito, CA: University Science Books, 315-363. (1994).
6. Rod, T. H., Logadottir, A. & NØrskov, J. K. Ammonia synthesis at low temperatures. *J. Chem. Phys.* 112, 5343-5347 (2000).
7. Hoffman, B. M. et al. Nitrogenase: a draft mechanism. *Acc. Chem. Res.* 46, 587-595 (2013).
8. Rittle, J., McCrory, C. C. L. & Peters, J. C. A 106-fold enhancement in N$_2$-binding affinity of an Fe$_2$(µ-H)$_2$ core upon reduction to a mixed-valence Fe$^{II}$Fe$^I$ state. *J. Am. Chem. Soc.* 136, 13853-13862 (2014).
9. Rittle, J. & Peters, J. C. An Fe—N$_2$ complex that generates hydrazine and ammonia via Fe☐N═NH$_2$: demonstrating a hybrid distal-to-alternating pathway for N$_2$ reduction. *J. Am. Chem. Soc.* 138, 4243-4248 (2016).
10. Buscagan, T. M., Oyala, P. H. & Peters, J. C. N$_2$-to-NH$_3$ conversion by a triphos—iron catalyst and enhanced turnover under photolysis. *Angew. Chem. Int. Ed.* 56, 6921-6926 (2017).

11. Li, Y. et al. Ammonia formation by a thiolate-bridged diiron amide complex as a nitrogenase mimic. *Nature Chem.* 5, 320-326 (2013).
12. Broda, H. & Tuczek, F. Catalytic ammonia synthesis in homogeneous solution—biomimetic at last? *Angew. Chem. Int. Ed.* 53, 632-634 (2014).
13. Eda. G. et al. Coherent atomic and electronic heterostructures of single-layer $MoS_2$. *ACS Nano* 6, 7311-7317 (2012).
14. Reddy, D. A. et al. Hydrazine-assisted formation of ultrathin $MoS_2$ nanosheets for enhancing their co-catalytic activity in photocatalytic hydrogen evolution. *J. Mater. Chem. A* 5, 6981-6991 (2017).
15. van der Ham, C. J. M., Koper, M. T. M. & Hetterscheid, D. G. H. Challenges in reduction of dinitrogen by proton and electron transfer. *Chem. Soc. Rev.* 43, 5183-5191 (2014).
16. Harald, F., Chukalina, M. & Scheinost, A. C. A new FEFF-based wavelet for EXAFS data analysis. *J. Synch. Rad.* 14, 426-432 (2007).
17. Gangwar, J. et al. Time-resolved and photoluminescence spectroscopy of $\theta\text{-}Al_2O_3$ nanowires for promising fast optical sensor applications. *Dalton Trans.* 43, 17034-17043 (2014).
18. Li, M. M. J. et al. Importance of the structural integrity of a carbon conjugated mediator for photocatalytic hydrogen generation from water over a CdS-carbon nanotube-$MoS_2$ composite. *Chem. Commun.* 52, 13596-13599 (2016).
19. Hidalgo, R. et al. Infrared spectroscopy during electrocatalytic turnover reveals the Ni-L active site state during $H_2$ oxidation by a NiFe hydrogenase. *Angew. Chem. Int. Ed.* 54, 7110-7113 (2015).
20. Kresse, G. & Hafner, J. Ab initio molecular dynamics for liquid metals. *Phys. Rev. B* 47, 558-561 (1993).
21. Perdew, J. P., Burke, K. & Ernzerhof, M. Generalized gradient approximation made simple. *Phys. Rev. Lett.* 77, 3865-3868 (1996).
22. Blochl, P. E. Projector augmented-wave method. *Phys. Rev. B: Condens. Matter Mater. Phys.* 50, 17953-17979 (1994).
23. Monkhorst, H. J. & Pack, J. D. Special points for Brillouin-zone integrations. *Phys. Rev. B: Solid State* 13, 5188-5192 (1976).
24. Fei, H. et al. Atomic cobalt on nitrogen-doped graphene for hydrogen generation. *J. Bio. Ino. Chem.* 20, 447-460 (2015).
25. R. Bjornsson, et al., The discovery of Mo (III) in FeMoco: reuniting enzyme and model chemistry. *J. Bio. Ino. Chem.* 20, 447-460 (2015).
26. van der Ham, C. J. M., Koper, M. T. M. & Hetterscheid, D. G. H. Challenges in reduction of dinitrogen by proton and electron transfer. *Chem. Soc. Rev.* 43, 5183-5191 (2014).
27. Reddy, D. A. et al. Hydrazine-assisted formation of ultrathin $MoS_2$ nanosheets for enhancing their co-catalytic activity in photocatalytic hydrogen evolution. *J. Mater. Chem. A* 5, 6981-6991 (2017).
28. Shi, H. Y. et al. Exciton dynamics in suspended monolayer and few-layer $MoS_2$ 2D crystals. *ACS nano* 7, 1072-1080 (2013).
29. Brown, K. A. et al. Light-driven dinitrogen reduction catalyzed by a CdS: nitrogenase MoFe protein biohybrid. *Science* 352, 448-450 (2016).
30. Lashgari, M. & Zeinalkhani, P. Ammonia photosynthesis under ambient conditions using an efficient nanostructured $FeS_2$/CNT solar-energy-material with water feedstock and nitrogen gas. *Nano Energy* 48, 361-368 (2018).
31. Hirakawa, H. et al. Photocatalytic conversion of nitrogen to ammonia with water on surface oxygen vacancies of titanium dioxide. *J. Am. Chem. Soc.* 139, 10929-10936 (2017).
32. Schrauzer, G. N. & Guth, T. D. Photocatalytic reactions. 1. Photolysis of water and photoreduction of nitrogen on titanium dioxide. *J. Am. Chem. Soc.* 99, 7189-7193 (1977).
33. Li, H. et al. Facet-dependent solar ammonia synthesis of BiOCl nanosheets via a proton-assisted electron transfer pathway. *Nanoscale* 8, 1986-1993 (2016).
34. Li, L. et al. Nitrogen photofixation over III-nitride nanowires assisted by ruthenium clusters of low atomicity. *Angew. Chem.* 129, 8827-8831 (2017).
35. Zhang, N. et al. Refining defect states in $W_{18}O_{49}$ by Mo doping: a strategy for tuning $N_2$ activation towards solar-driven nitrogen fixation. *J. Am. Chem. Soc.* 140, 9434-9443. (2018).
36. Watt, G. W. & Chirsp, J. D. Spectrophotometric method for determination of hydrazine. *Anal. Chem.* 24, 2006-2008 (1952).
37. Medford, A. J. et al. From the Sabatier principle to a predictive theory of transition-metal heterogeneous catalysis. *J. Catal.* 328, 36-42 (2015).

The invention claimed is:

1. A photocatalyst comprising:
   a layered base material comprising 1 to 100 layers, the layered base material being selected from the group consisting of molybdenum disulfide, tungsten disulfide, molybdenum telluride, tungsten telluride, molybdenum selenide and tungsten selenide; and
   0.1-10.0% by weight, relative to the weight of the base material, of one or more Group VI, VII, VIII, IX or X transition metals, wherein the one or more Group VI, VII, VIII, IX or X transition metals is selected from the group consisting of Fe, Mn, Co, Ni, Ru, Rh, Pd and Pt, wherein the photocatalyst further comprises 0.1-50.0% by weight, relative to the weight of the base material, of one or more semiconductor materials having an average particle size of 0.5-50.0 nm.

2. The photocatalyst of claim 1, wherein the layered base material comprises 1 and 10 layers.

3. The photocatalyst of claim 1, wherein the layered base material is molybdenum disulfide.

4. The photocatalyst of claim 1, wherein the photocatalyst comprises 1.0-3.0% by weight, relative to the weight of the base material, of one or more Group VI, VII, VIII, IX or X transition metals.

5. The photocatalyst of claim 1, wherein the one or more Group VI, VII, VIII, IX or X transition metals is Fe.

6. The photocatalyst of claim 1, wherein the size of the one or more Group VI, VII, VIII, IX or X transition metals ranges from single atoms of the transition metals to atomic clusters of the transition metals having a maximum diameter of 4.0 nm.

7. The photocatalyst of claim 1, wherein the one or more semiconductor materials has an average particle size of 0.5-15.0 nm.

8. The photocatalyst of claim 7, wherein the one or more semiconductor materials has the compositional formula $AB_xC_{1-x}$, wherein
   A is selected from the group consisting of Cd, Pb and In;
   B and C are selected from the group consisting of S, Se, Te, As and P; and
   x is a number ranging from 0.01 to 1.

9. The photocatalyst of claim 7, wherein the one or more semiconductor materials is cadmium sulfide.

10. The photocatalyst of claim 1, wherein the photocatalyst has an average particle size of 0.05-100 μm.

11. A process for preparing a photocatalyst as claimed in claim 1, the process comprising the steps of:
   a) providing a dispersion of a layered base material comprising 1 to 100 layers, the layered base material being selected from the group consisting of molybdenum disulfide, tungsten disulfide, molybdenum telluride, tungsten telluride, molybdenum selenide and tungsten selenide; and
   b) contacting the dispersion of the layered base material with a solution of one or more Group VI, VII, VIII, IX or X transition metals, wherein the one or more Group VI, VII, VIII, IX or X transition metals is selected from the group consisting of Fe, Mn, Co, Ni, Ru, Rh, Pd and Pt,
   wherein the photocatalyst resulting from step b) is contacted with an aqueous solution of one or more semiconductor materials having an average particle size of 0.5-50.0 nm.

12. The process of claim 11, wherein the layered base material having between 1 and 100 layers is prepared by exfoliating the base material in its bulk form.

13. The process of claim 12, wherein the base material in its bulk form is exfoliated by:
   (i) contacting an aqueous mixture of the base material in its bulk form with an intercalant;
   (ii) sonicating the mixture resulting from step (i); and
   (iii) isolating the layered base material having between 1 and 100 layers resulting from step (ii).

14. The process of claim 13, wherein step b) is conducted at a temperature of 130-190° C., under hydrothermal conditions.

15. A photocatalytic process for the conversion of molecular nitrogen to ammonia, the process comprising the step of:
   a) contacting molecular nitrogen with a photocatalyst as claimed in claim 1 in the presence of water;
   wherein step a) is performed under the application of electromagnetic radiation having a wavelength of 270-1000 nm.

16. The process of claim 15, wherein the electromagnetic radiation is supplied to the mixture of step a) using a solar concentrator.

17. The process of claim 15, wherein step a) is conducted at a temperature of 10-50° C.

18. The process of claim 15, wherein the photocatalyst is provided as:
   A) a fixed bed;
   B) a suspension; or
   C) a thin film.

19. The process of claim 15, wherein step a) is performed as:
   A) a batch process; or
   B) a continuous process.

* * * * *